United States Patent
Park et al.

(10) Patent No.: US 9,377,915 B2
(45) Date of Patent: Jun. 28, 2016

(54) CAPACITIVE TOUCH SENSOR

(75) Inventors: Hong June Park, Pohang-si (KR); Jae Seung Lee, Pohang-si (KR); Dong Hee Yeo, Seoul (KR); Sang Su Lee, Daegu (KR); Joon Ho Cho, Pohang-si (KR); Hye Jung Kwon, Daegu (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 110 days.

(21) Appl. No.: 14/374,462

(22) PCT Filed: Mar. 20, 2012

(86) PCT No.: PCT/KR2012/001993
§ 371 (c)(1),
(2), (4) Date: Jul. 24, 2014

(87) PCT Pub. No.: WO2013/058446
PCT Pub. Date: Apr. 25, 2013

(65) Prior Publication Data
US 2014/0368467 A1 Dec. 18, 2014

(30) Foreign Application Priority Data

Oct. 21, 2011 (KR) ......................... 10-2011-0108139
Jan. 20, 2012 (KR) ......................... 10-2012-0006518

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01)

(58) Field of Classification Search
CPC ..... G06F 3/0412; G06F 3/044; H03K 17/962; H03K 17/955; H03K 21/00; H03K 23/00; H03K 23/42; G01D 5/24
See application file for complete search history.

(56) References Cited

U.S. PATENT DOCUMENTS 8,035,622 B2 * 10/2011 Hotelling .............. G06F 3/0416
341/126
8,654,083 B2 * 2/2014 Hotelling ............ G02F 1/13338
345/173

(Continued)

FOREIGN PATENT DOCUMENTS

KR 10-2011-0001897 1/2011
KR 10-2011-0026765 3/2011

OTHER PUBLICATIONS

International Search Report for International Application No. PCT/KR2012/001993, dated Oct. 31, 2012.

*Primary Examiner* — Jonathan Boyd
*Assistant Examiner* — Sardis Azongha
(74) *Attorney, Agent, or Firm* — Kile Park Reed & Houtteman PLLC

(57) ABSTRACT

Provided is a capacitive touch sensor which includes a flat panel display for displaying an image and a touch sensor panel positioned on the flat panel display or embedded in the flat panel display. The capacitive touch sensor may include: a driving clock generator configured to generate a plurality of time-periodic output signals by using a gate driver signal of the flat panel display, and apply the generated time-periodic output signals to the touch sensor panel and a receiver circuit unit; a driver configured to generate a driving signal of the touch sensor panel using a part of the output signals of the driving clock generator; and the receiver circuit unit configured to process noise contained in a signal received from the touch sensor panel, using the output signals.

30 Claims, 26 Drawing Sheets

(56) References Cited

U.S. PATENT DOCUMENTS

| | | | | |
|---|---|---|---|---|
| 8,692,776 B2* | 4/2014 | Yousefpor | G06F 3/0418 | 345/173 |
| 8,743,300 B2* | 6/2014 | Chang | G06F 3/0412 | 349/12 |
| 8,878,797 B2* | 11/2014 | Erdogan | G01R 27/2605 | 178/18.06 |
| 2007/0018704 A1* | 1/2007 | Ishii | H03L 7/0814 | 327/165 |
| 2008/0191800 A1* | 8/2008 | Fang | H03F 1/26 | 330/9 |
| 2010/0060590 A1* | 3/2010 | Wilson | G06F 3/0416 | 345/173 |
| 2010/0060593 A1* | 3/2010 | Krah | G06F 3/0416 | 345/173 |
| 2010/0060610 A1* | 3/2010 | Wu | G06F 3/044 | 345/174 |
| 2010/0110040 A1* | 5/2010 | Kim | G06F 3/0412 | 345/174 |
| 2010/0300773 A1 | 12/2010 | Cordeiro et al. | | |
| 2010/0328257 A1* | 12/2010 | Noguchi | G06F 3/044 | 345/174 |
| 2011/0031042 A1 | 2/2011 | Wu et al. | | |
| 2011/0115729 A1* | 5/2011 | Kremin | G06F 3/0418 | 345/173 |
| 2011/0199105 A1* | 8/2011 | Otagaki | G06F 3/044 | 324/679 |

* cited by examiner

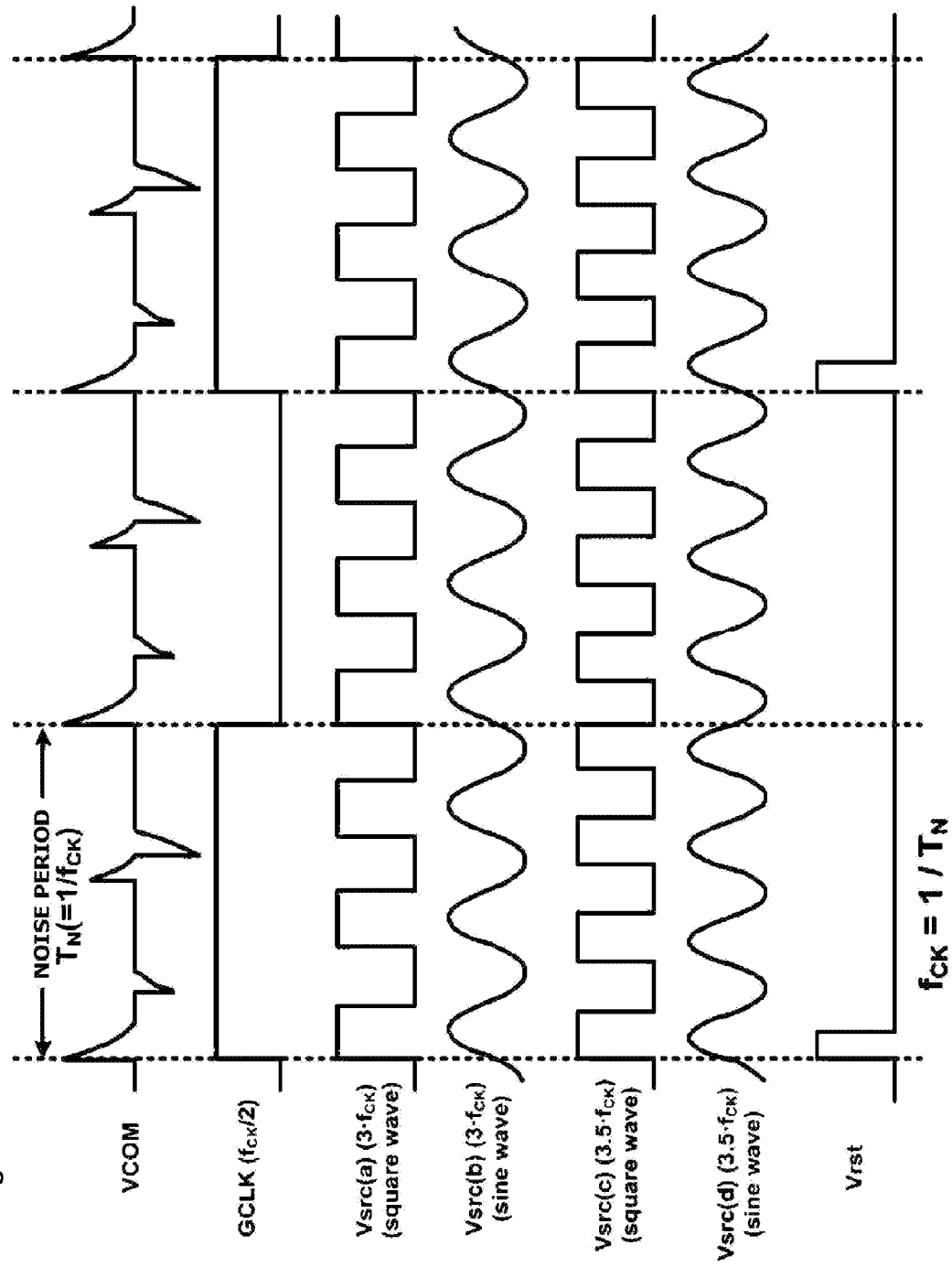

CAPACITIVE TOUCH SENSOR

BACKGROUND OF THE INVENTION

1. Field of the Invention

The present invention relates to a touch sensor attached on a flat panel display including a liquid crystal display (LCD) and an organic light-emitting diode (OLED), and more particularly, to a mutual capacitance measuring touch sensor which is insensitive to self-generated noise of a flat panel display while extracting mutual capacitance between two electrodes crossing each other in a capacitive touch sensor panel.

2. Description of the Related Art

Recently, the revolution of the IT industry has created various types of electronic devices. In particular, various electronic devices with new designs and functions have continuously emerged in the field of portable electronic devices such as notebook computers, mobile phones, and portable multimedia players (PMP).

In the case of a mobile phone or tablet PC, a touch sensor panel is attached to a flat panel display including an LCD or OLED, and used as an input device through a touch operation using a finger or pen.

As for the early touch sensor panels, a resistive touch sensor panel has been frequently used. The resistive touch sensor panel includes two flexible membranes each having a transparent electrode applied on the entire surface thereof, and the two flexible membranes are positioned close to each other with a uniform distance maintained therebetween. When a touch occurs, parts of the two flexible membranes are mechanically contacted with each other and electrically coupled to each other, and the contact position is detected through a touch sensor circuit. In this case, since the mechanical touch is transmitted to the touch sensor panel and the flat panel display through the touch operation, the lifetime of the devices may be reduced.

Recently, in order to overcome such a disadvantage, a capacitive touch sensor panel has been frequently used, which removes mechanical contact by employing tempered glass instead of flexible membranes. In the capacitive touch sensor panel, a glass plane for touch sensor panel is positioned over a flat panel display, and tempered glass is attached on the glass plane. Thus, although a touch operation is performed on the tempered glass through a finger or pen, the mechanical touch is not transmitted to the flat panel display and the glass plane for touch sensor panel, which are positioned under the tempered glass. Therefore, although a touch operation is repeatedly performed on the capacitive touch sensor panel, the lifetime of the display device is not reduced.

The glass plane for touch sensor panel may include transparent electrodes arranged thereon. The capacitive touch sensor panel is divided into a self-capacitance measuring touch sensor panel and a mutual-capacitance measuring touch sensor panel. At the beginning, the self-capacitance measuring touch sensor panel has been mainly used. However, as the number of simultaneous touches increases to three or more, the use of the mutual-capacitance measuring touch sensor panel has gradually increased.

In the capacitive touch sensor panel, a touched position may be recognized by connecting a touch sensor circuit to measure self-capacitance between each conducting wire and the ground or mutual capacitance between two conducting wires crossing each other. At this time, the reference node (ground) of the self-capacitance corresponds to an LCD common electrode (VCOM) terminal in the case of an LCD.

However, the mutual-capacitance measuring touch sensor panel has a considerably low signal-to-noise ratio (SNR), due to common electrode (VCOM) noise which is self-generated from a flat panel display such as LCD. Thus, the mutual-capacitance measuring touch sensor panel is required to reduce the influence of the VCOM noise which is self-generated from the flat panel display. Furthermore, since the mutual-capacitance measuring touch sensor panel must measure capacitance, a charge amplifier is mainly used at the first stage of a receiver circuit unit.

As the method for reducing the influence of VCOM noise which is self-generated from the flat panel display such as LCD, the following methods have been attempted in the mutual-capacitance measuring touch sensor panel:

(1) chopper method;
(2) method of increasing the amplitude of a touch sensor panel driving signal;
(3) method of adjusting the frequency of a touch sensor panel driving signal; and
(4) method of operating the touch sensor panel only during the time period in which the flat panel display is not operated.

According to the chopper method, the same signal as a driving signal applied to the capacitive touch sensor panel is applied to the receiver circuit unit, the same signal as the driving signal is passed through the charge amplifier and a chopper circuit, and an output signal thereof is passed through an integrator or low-pass filter. Then, the influence of VCOM noise in the output of the integrator or the low-pass filter may be reduced.

According to the method of increasing the amplitude of a touch sensor panel driving signal, the amplitude of the touch sensor panel driving signal may be increased in order to increase the SNR of an output signal of the receiver circuit unit to one or more.

According to the method of adjusting the frequency of a touch sensor panel driving signal, a frequency with low noise is found on the frequency spectrum of VCOM noise, and the frequency of the driving signal is adjusted to the frequency with low noise.

According to the method of operating the touch sensor panel only during the time period in which the flat panel display is not operated, since VCOM noise does not occur during VBALNK period which is required until the next frame screen is transmitted after one frame screen is transmitted in the flat panel display, the touch sensor circuit is operated only during the VBLANK period.

Before the technical idea of the present invention is described, the structure of LCD needs to be first understood. The currently used LCD may be divided into a vertical alignment (VA) LCD and an in-plane switching (IPS) LCD.

In the VA LCD as illustrated in FIG. 1, since a common electrode (VCOM) node is disposed on a top glass substrate which is positioned remote from a backlight unit of the plane LCD, between two glass substrates forming the plane LCD, the VCOM node is positioned close to a capacitive touch sensor panel electrode.

In the IPS LCD as illustrated in FIG. 2, since a VCOM node is disposed on a bottom glass substrate positioned close to a backlight unit, the VCOM node is positioned remote from a capacitive touch sensor panel electrode. In the IPS LCD, however, since no conductive plane exists between the touch sensor panel and the LCD, the touch sensor panel electrode is directly exposed to a video signal (analog gray scale signal) which is driven by a TFT or source driver.

Each pixel of the LCD includes two electrodes and liquid crystal, a color filter and the like, which are positioned between the two electrodes. The electrodes may include transparent electrodes formed of indium tin oxide (ITO) or the like over a glass plane. As illustrated in FIG. 3, an analog signal indicating gray scale is applied to one of the two electrodes through a TFT switch from the source driver, and a DC voltage of 5V is commonly applied to the other electrode in all of the pixels. This common node is referred to as a common electrode (VCOM) node. In general, the capacitive touch sensor panel has no ground or reference electrode, and is directly attached over the LCD device. Thus, the VCOM node serves as a reference voltage node of the capacitive touch sensor panel, that is, the ground.

Referring to FIG. 3, gate driver lines G1 to G3 corresponding to the respective rows or columns of the LCD are sequentially driven according to the positions thereof. Each of the gate driver lines is coupled to the gate nodes of a large number of TFT switches. In the case of full HD, about 6,000 TFT switches are coupled. Thus, a relatively large capacitance of several tens pF is coupled to one gate driver line. The gate driving signal maintains a value of about −5V during turn-off, and maintains a value of about +25V during turn-on. Thus, since a considerably large voltage variation occurs at a rising or falling edge of the gate driver signal for a short time, a considerable magnitude of displacement current (C·dV/dt) $I_N(t)$ flows into the LCD VCOM node through a gate capacitance $C_{GD}$ and a liquid crystal capacitance $C_{LC}$ of the TFT.

FIG. 4 is a diagram illustrating the mechanism in which VCOM noise is generated by a driving signal of a gate driver line of FIG. 3. Referring to FIG. 4, the displacement current $I_N(t)$ passes through a common electrode (VCOM) plane having transparent electrodes arranged thereon, and then flows through an output resistor RO of a common electrode (VCOM) driver. Thus, the waveform of VCOM noise appears in the form of an impulse at rising and falling edges of the gate driver signal.

As illustrated in FIG. 3, however, the gate driver signal is sequentially moved to the next gate driver line. In all of the gate driver lines, the VCOM noise has an impulse waveform at each of the rising and falling edges of the gate driver signal. Thus, the VCOM noise has a time-periodic waveform, and the period of the VCOM noise is equal to the time period in which the corresponding gate driver signal is maintained at a high level. The period of the VCOM noise corresponds to the half of the period of the gate driver signal.

As described above, the capacitive touch sensor panel is divided into a self-capacitance measuring touch sensor panel and a mutual-capacitance measuring touch sensor panel. When the self-capacitance measuring touch sensor panel is touched, capacitance between the human body and the earth is added to self-capacitance, thereby increasing the value of the self-capacitance. Thus, this phenomenon is used to determine whether a touch occurred. Furthermore, since the self-capacitance has a large capacitance value of 50 pF or more, the self-capacitance is insensitive to VCOM noise.

In the capacitive touch sensor panel, however, when the number of simultaneous touches increases to three or more, mutual capacitance must be measured. When a touch operation is performed, the mutual capacitance decreases. Typically, the mutual capacitance has a value of about 1 pF. As illustrated in FIG. 7 below, VCOM noise appears in an output of a charge amplifier through self-capacitance $C_{SXj}$ between an LCD common electrode (VCOM) and a touch sensor panel electrode coupled to the charge amplifier.

Although the amplitude of the VCOM noise is smaller than the amplitude of the touch sensor panel driving signal, the self-capacitance $C_{SXj}$ is 50 or more times larger than mutual capacitance $C_{Mij}$. Thus, in many cases, the SNR of the output signal of the charge amplifier is smaller than 1. In such a case, in order for the mutual capacitance measuring touch sensor to overcome LCD VCOM noise and to stably determine whether a touch occurred, a noise reduction-type touch sensor is required.

SUMMARY OF THE INVENTION

Accordingly, the present invention has been made in an effort to solve the problems occurring in the related art, and an object of the present invention is to provide a capacitive touch sensor which is insensitive to self-generated noise of a flat panel display and capable of reliably determining whether and where a touch occurred.

In order to achieve the above object, according to one aspect of the present invention, there is provided a capacitive touch sensor which includes a flat panel display for displaying an image and a touch sensor panel positioned on the flat panel display or embedded in the flat panel display. The capacitive touch sensor may include: a driving clock generator configured to generate a plurality of time-periodic output signals, and apply the generated time-periodic output signals to the touch sensor panel and a receiver circuit unit; a driver configured to generate a driving signal of the touch sensor panel using a part of the output signals of the driving clock generator; and the receiver circuit unit configured to process noise contained in a signal received from the touch sensor panel, using the output signals.

According to another aspect of the present invention, a capacitive touch sensor may include: a flat panel display; a touch sensor panel coupled to the flat panel display; a driving clock generator configured to generate a plurality of time-periodic output signals, using a clock signal for driving a gate of the flat panel display; a driver configured to drive the touch sensor panel using a part of the output signals of the driving clock generator; and a receiver circuit unit configured to receive a signal from the touch sensor panel and reduce noise.

According to another aspect of the present invention, a capacitive touch sensor may include: a flat panel display; a touch sensor panel coupled to the flat panel display; a driving clock generator configured to generate a plurality of time-periodic output signals using a clock signal for driving a gate of the flat panel display; a driver configured to drive the touch sensor panel using a part of the output signals of the driving clock generator; a receiver circuit unit configured to receive a signal from the touch sensor panel and reduce the influence of common electrode noise of the flat panel display; and an AC coupling circuit configured to transmit the waveform of the common electrode noise to the receiver circuit unit.

According to another aspect of the present invention, there is provided a capacitive touch sensor which includes a flat panel display for displaying an image and a touch sensor panel provided on or in the flat panel display. The capacitive touch sensor may include: a driving clock generator configured to generate a plurality of time-periodic output signals using a clock signal for driving a gate of the flat panel display; a driver having multiple output terminals of which each is electrically coupled one-to-one to one of Y electrodes of the touch sensor panel; and a receiver circuit unit having multiple input terminals of which each is electrically coupled one-to-one to one of X electrodes of the touch sensor panel. Each of the multiple input terminals of the receiver circuit unit is electrically coupled one-to-one to an inverting input terminal of a charge amplifier existing in the receiver circuit unit, and mutual capacitance is formed between the flat panel display and an i-th Y electrode and a j-th X electrode of the touch sensor panel.

According to another aspect of the present invention, there is provided a capacitive touch sensor which drives a flat panel display and a touch sensor panel coupled to the flat panel display. The capacitive touch sensor may include: a driving clock generator configured to generate a plurality of time-periodic output signals using a clock signal for driving a gate of the flat panel display; a driver configured to drive the touch sensor panel using a part of the output signals of the driving clock generator; a receiver circuit unit configured to receive a signal from the touch sensor panel and reduce the influence of common electrode noise of the flat panel display; and an analog-to-digital converter (ADC) configured to receive an output signal of the receiver circuit unit. The driving clock generator, the driver, the receiver circuit unit, and the ADC may be included in one integrated circuit chip.

BRIEF DESCRIPTION OF THE DRAWINGS

The above objects, and other features and advantages of the present invention will become more apparent after a reading of the following detailed description taken in conjunction with the drawings, in which:

FIG. 26 is a diagram illustrating a driving signal Vsrc and a reset signal Vrst which are generated through the circuit of FIG. 22.

DETAILED DESCRIPTION OF PREFERRED EMBODIMENTS

Figure 1:
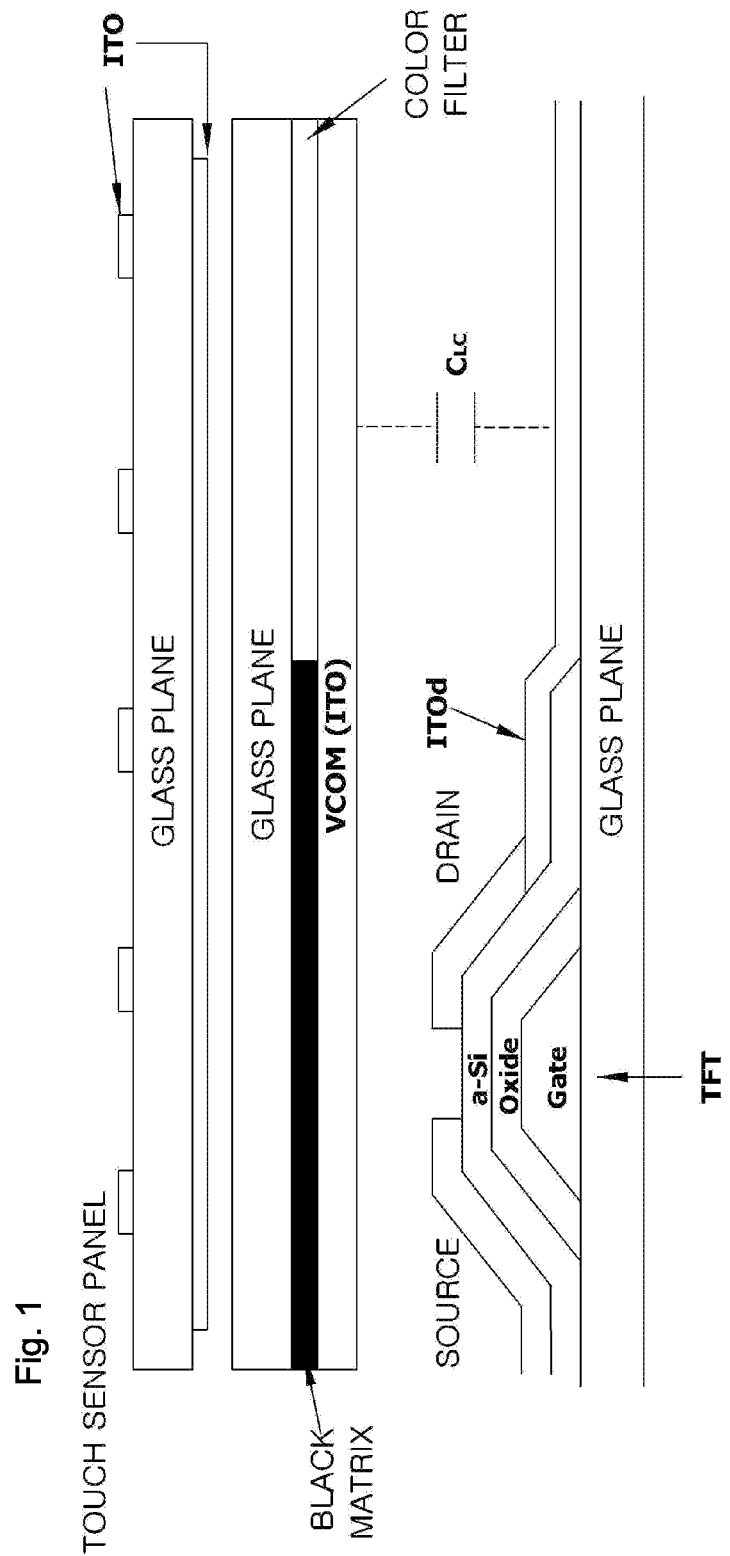
FIG. 1 is a cross-sectional view of a conventional LCD based on vertical alignment (VA)
Figure 2:
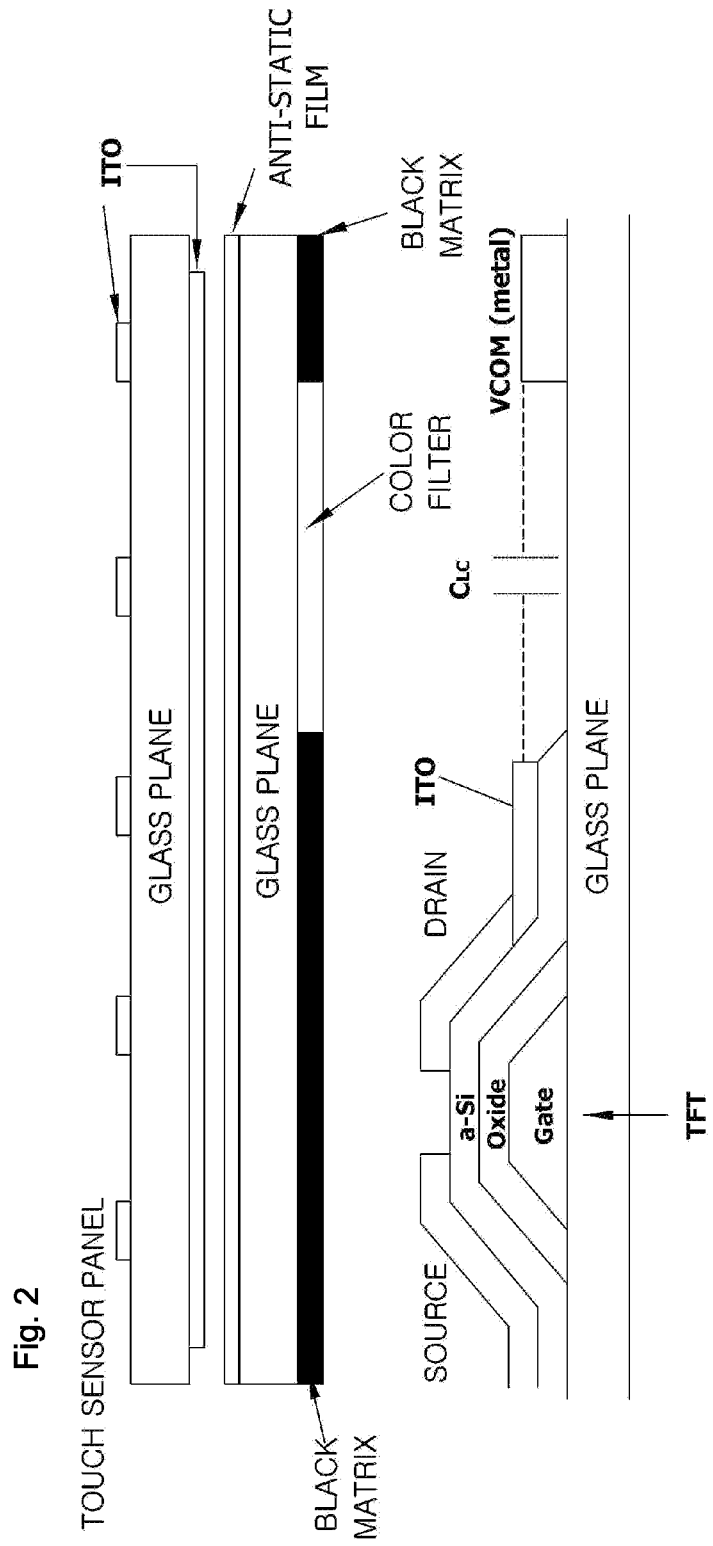
FIG. 2 is a cross-sectional view of an LCD based on in-plane switching (IPS)

Hereinafter, preferred embodiments of the present invention will be described with reference to the accompanying drawings. Each component or feature may be considered as a selective component or feature unless referred to the contrary. Furthermore, each component or feature may be embodied in such a form that is not coupled to another component or feature. Furthermore, some components and/or features may be combined to constitute an embodiment of the present invention. The order of operations described in the embodiments of the present invention may be changed. Some components or features in any one embodiment may be included in another embodiment, or substituted with the corresponding components or features of another embodiment.

In the descriptions for the drawings, procedures or steps which can obscure subject matters of the present invention may be omitted, and procedures or steps which can be understood by those skilled in the art may also be omitted. Furthermore, the same reference numerals will be used throughout the specification to refer to the same or like parts.

Specific terms used in the embodiments of the present invention may be provided to promote understanding of the present invention, and modified into other forms without departing the scope of the present invention.

Hereinafter, preferred embodiments of the present invention will be described with reference to the accompanying drawings. The following descriptions with the accompanying drawings may indicate exemplary embodiments of the present invention, but do not indicate the only embodiment of the present invention.

Figure 5:
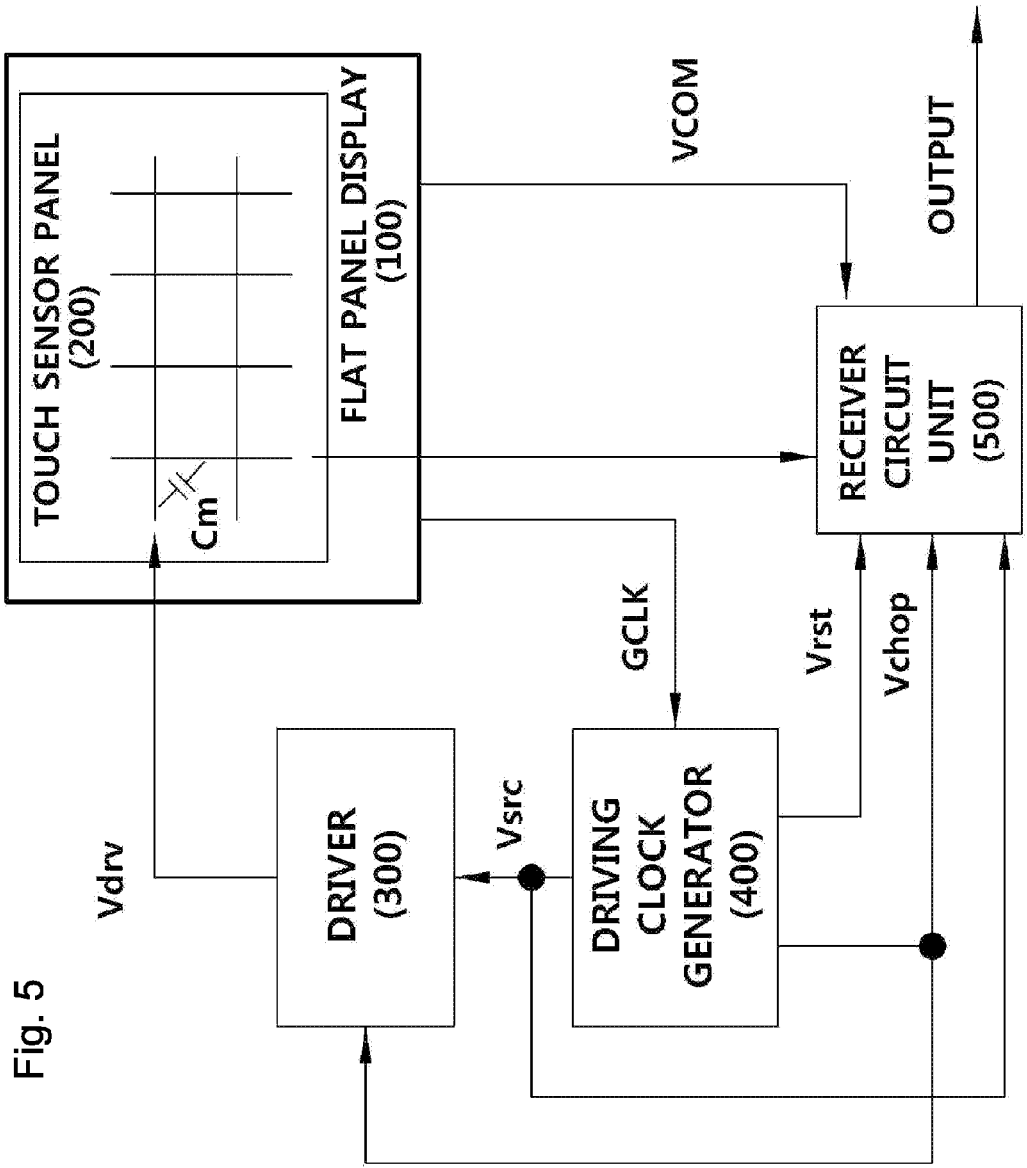
FIG. 5 is a diagram illustrating the layout of a mutual capacitance measuring touch sensor according to an embodiment of the present invention.

FIG. 5 is a diagram illustrating the structure of a mutual capacitance measuring touch sensor according to an embodiment of the present invention.

Referring to FIG. 5, the mutual capacitance measuring touch sensor according to the embodiment of the present invention includes a flat panel display 100 having a touch sensor panel 200 attached thereon and a touch sensor circuit including a driver 300, a driving clock generator 400, and a receiver circuit unit 500, which are connected to input/output terminals of the flat panel display 100.

In the present embodiment, the touch sensor panel 200 is attached on the top of the flat panel display 100. However, the present invention may be applied to an in-cell type structure in which the touch sensor panel is embedded in the flat panel display as well as an on-cell type structure in which the touch sensor panel is positioned on the flat panel display.

The driving clock generator 400 generates a periodic signal to apply to the touch sensor panel 200, the driver 300 converts an output signal Vsrc or Vchop of the driving clock generator 400 into a driving signal Vdrv for driving the touch sensor panel 200, and the receiver circuit unit 500 processes a signal received from the touch sensor panel 200.

The mutual capacitance measuring touch sensor according to the embodiment of the present invention may generate the driving signal Vdrv applied to the touch sensor panel 200 and the output signal Vsrc for generating the driving signal Vdrv as a periodic signal such as a sine wave or square wave, set the frequency of the output signal Vsrc to a positive integer multiple or (positive integer multiple+0.5) of the reciprocal of the period of VCOM noise in the flat panel display, and compensate for the influence of the VCOM noise, in order to remove the influence of the VCOM noise (refer to FIG. 3) which is self-generated from the flat panel display 100.

Figure 3:
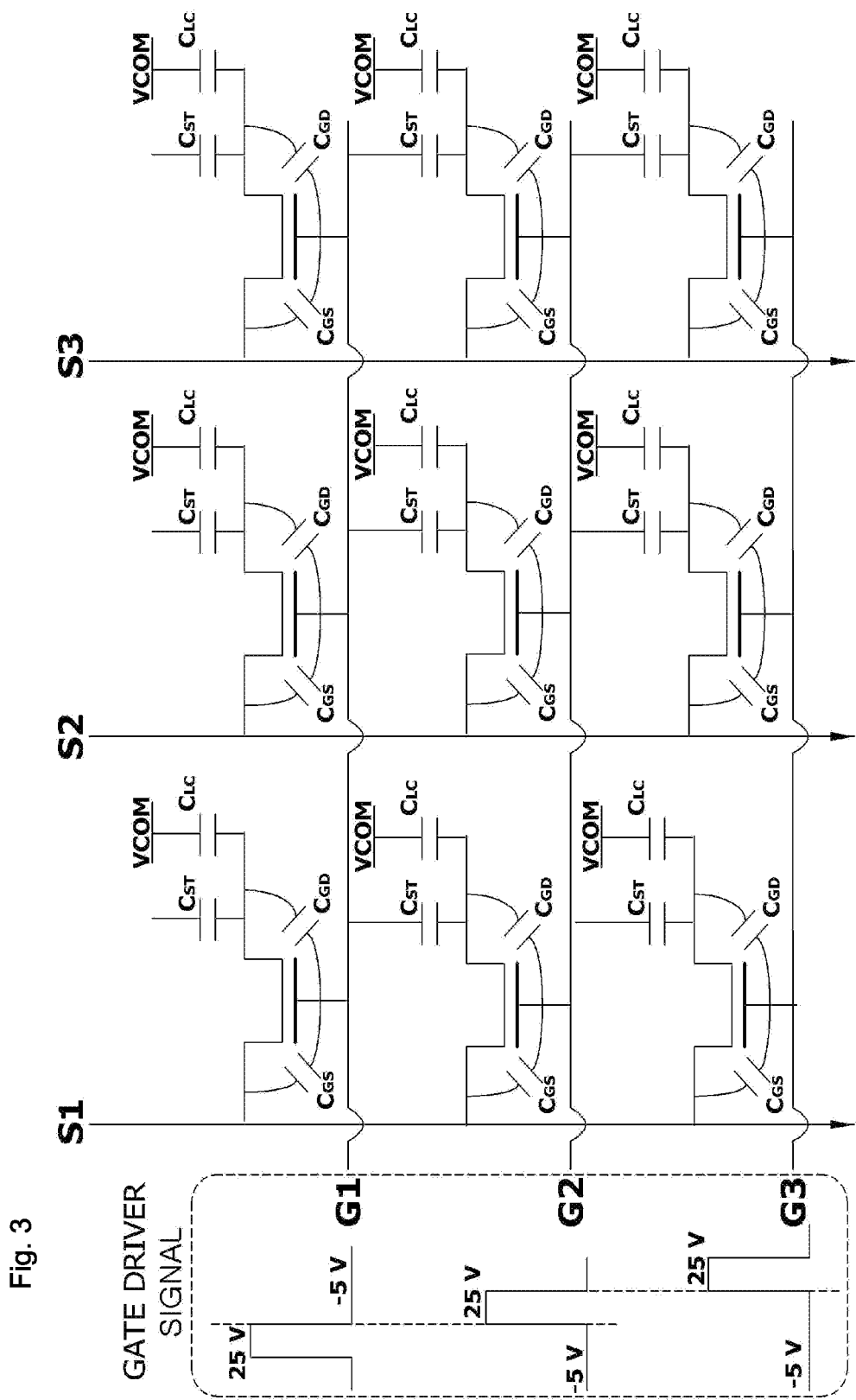
FIG. 3 is a diagram illustrating that gate driver lines of FIGS. 1 and 2 are sequentially driven.
Figure 4:
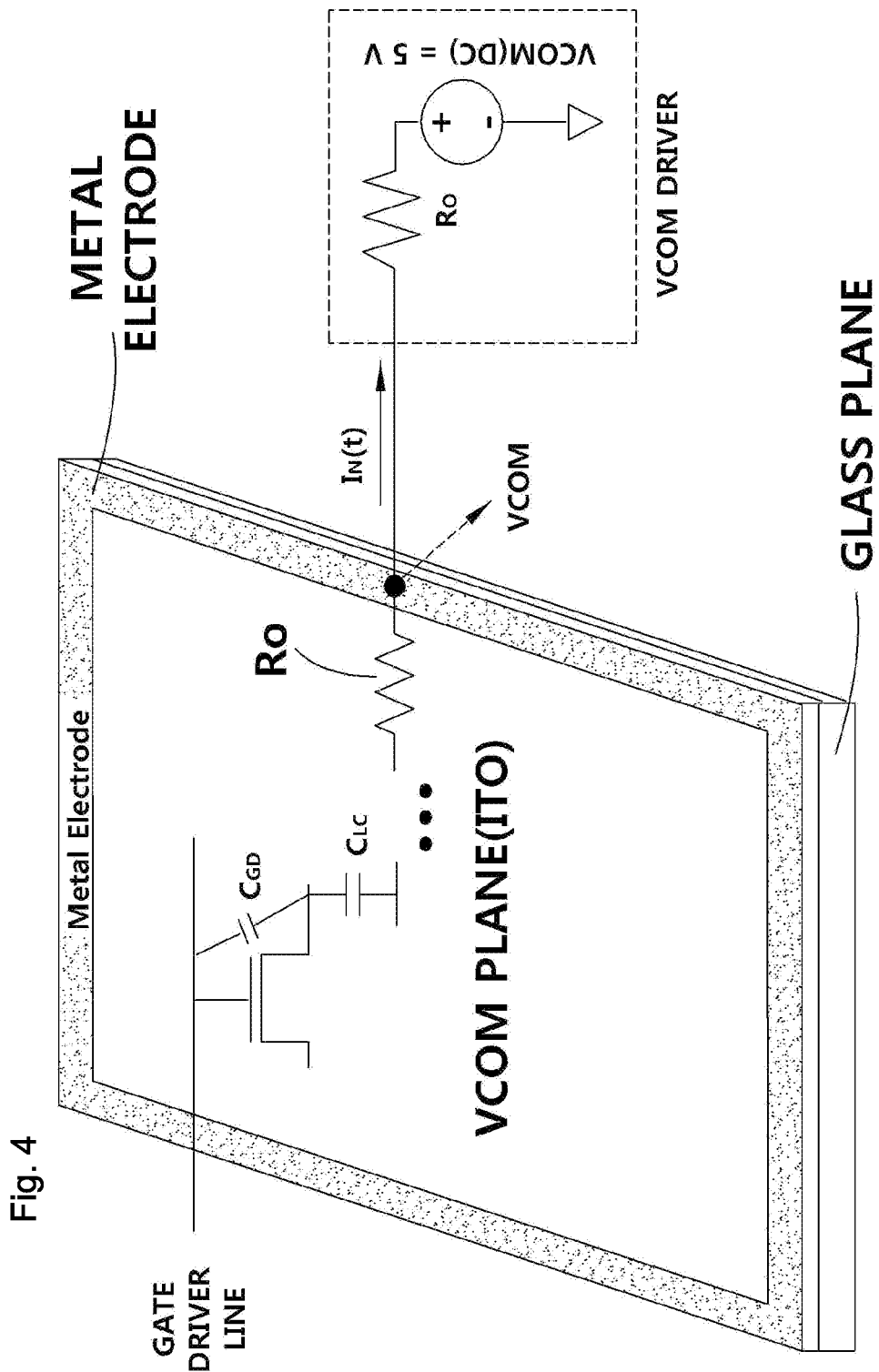
FIG. 4 is a diagram illustrating the mechanism in which common electrode (VCOM) noise is generated by a driving signal of the gate driver line of FIG. 3.

The noise waveform of the common electrode (VCOM) in the flat panel display appears in synchronization with the gate driver signal of FIG. 3, and the gate driver signal is generated from a gate driver clock signal GCLK of the flat panel display. Thus, the driving signal Vdrv applied to the touch sensor panel 200 needs to be generated from the gate driver clock signal GCLK.

Figure 7:
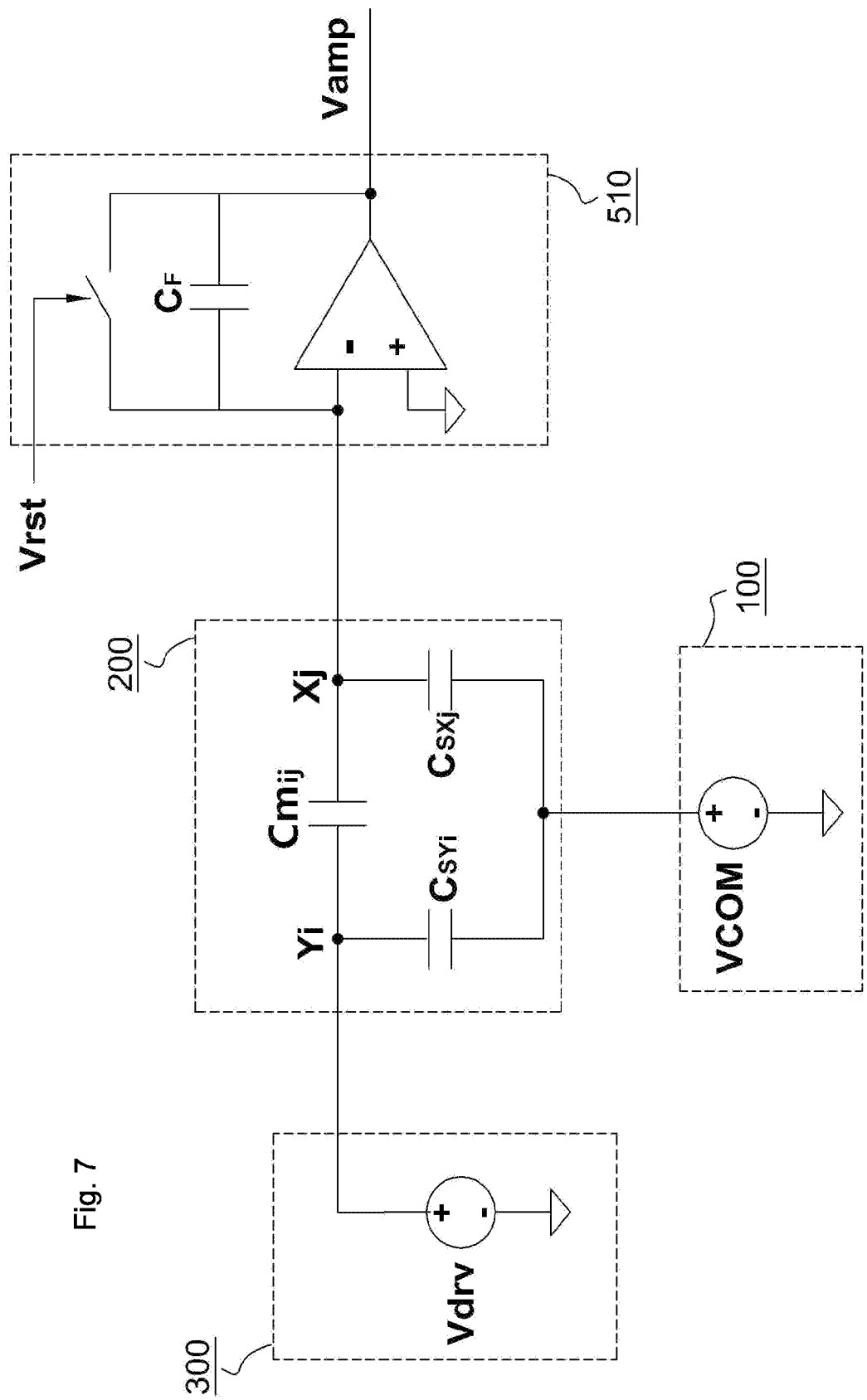
FIG. 7 is a diagram illustrating the structure of the mutual capacitance measuring touch sensor which includes a charge amplifier coupled at the first stage of a receiver circuit unit.
Figure 12:
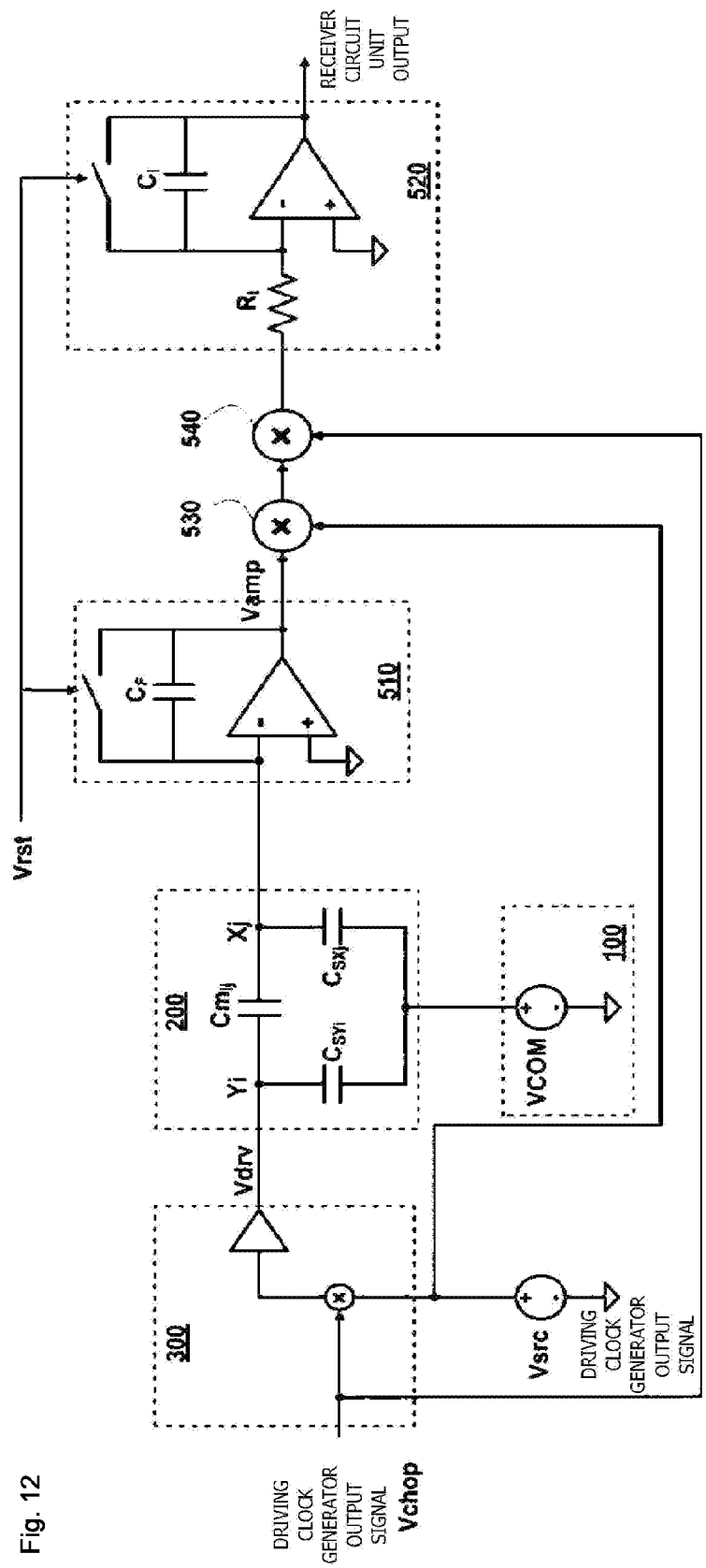
FIG. 12 is a diagram illustrating a touch sensor circuit which includes two analog multipliers synchronized with the receiver circuit unit and driving signals Vsrc and Vchop synchronized with the VCOM noise.

The receiver circuit unit 500 includes a charge amplifier 510 illustrated in FIG. 7 and an analog multiplier 530, a chopper circuit 540, and an integrator 520 which are illustrated in FIG. 12. When the integrator 520 is substituted with a low-pass filter, the low-pass filter may perform the same function as the integrator 520 as long as the frequency of the output signal Vsrc of the driving clock generator of FIG. 5 is larger than the bandwidth of the low-pass filter.

Figure 11:
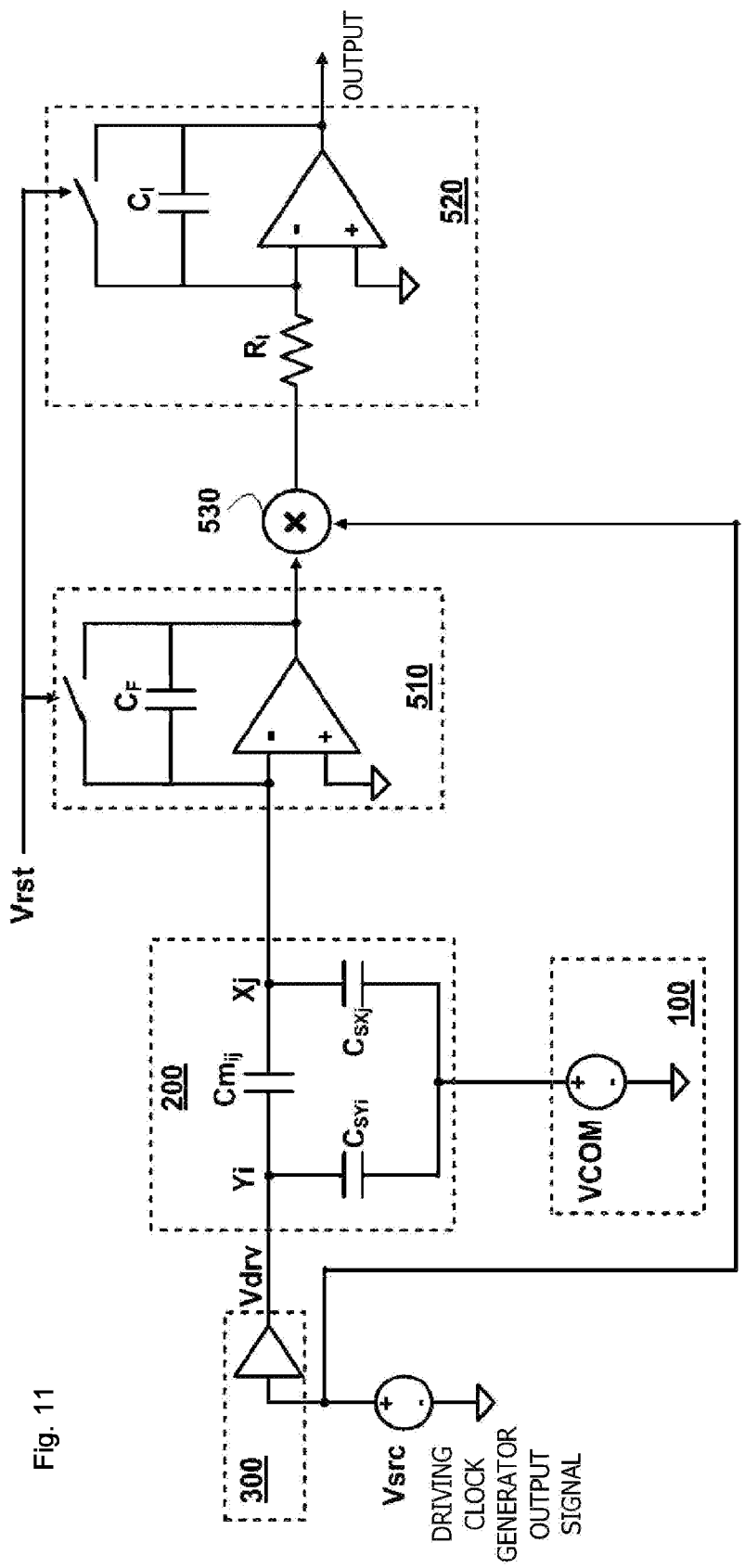
FIG. 11 is a diagram illustrating a touch sensor circuit which includes one analog multiplier synchronized with the receiver circuit unit and uses a driving signal Vsrc synchronized with the VCOM noise.

When one analog multiplier 530 and one integrator 520 are used in the charge amplifier as illustrated in FIG. 11, the analog multiplier 530 receives an output signal Vsrc of the driving clock generator and an output signal Vamp of the charge amplifier 510, and the integrator 520 receives an output signal of the analog multiplier as an input signal.

When two analog multipliers are used as illustrated in FIG. 12, the first analog multiplier 530 receives an output signal Vsrc of the driving clock generator and an output signal Vamp of the charge amplifier 520, the second analog multiplier 540 receives an output signal of the first analog multiplier and an output signal Vchop of the driving clock generator as input signals, and the integrator 520 receives an output signal of the second multiplier as an input signal. For convenience of description, the second analog multiplier may be referred to as a chopper circuit, in order to distinguish between the two analog multipliers.

The output signal Vchop serving as an input signal of the chopper circuit is generated through the driving clock generator 400, and has a period corresponding to an even multiple of the VCOM noise period. In this case, k in FIG. 22 may be set to a positive integer.

Furthermore, a reset signal Vrst is generated through the driving clock generator 400, and used to reset the outputs of the charge amplifier 510 and the integrator 520 of the receiver circuit unit 500. At this time, the reset signal Vrst may be generated using the output signal Vchop of the driving clock generator 400.

Figure 6:
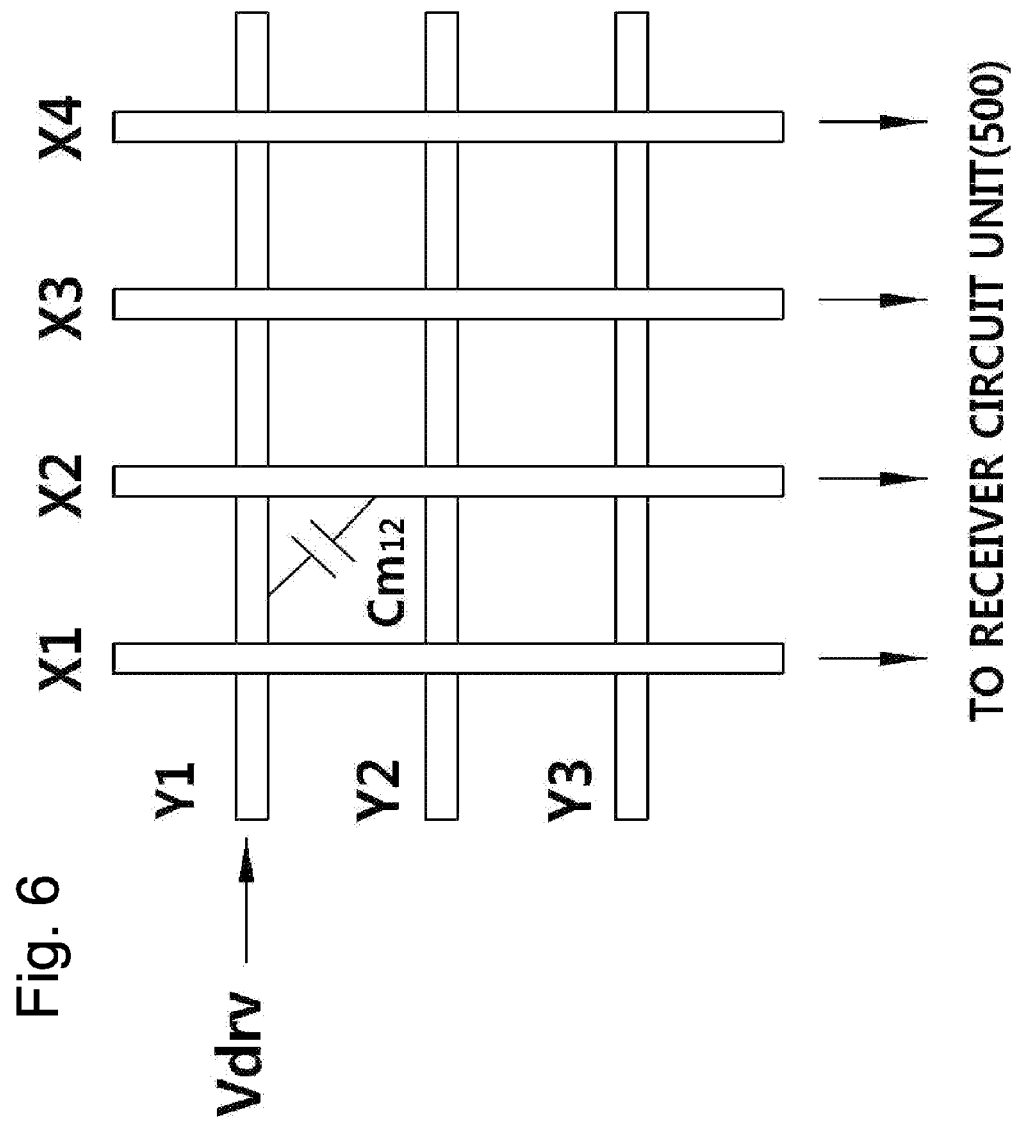
FIG. 6 is a diagram illustrating the layout of the touch sensor panel illustrated in FIG. 5.

FIG. 6 is a diagram illustrating the layout of the touch sensor panel illustrated in FIG. 5.

Referring to FIG. 6, the touch sensor circuit is coupled to the capacitive touch sensor panel 200 so as to measure mutual capacitance Cm between two conducting wires crossing each other, thereby determining whether and where a touch occurred. The reference node (ground) of self-capacitance corresponds to an LCD common electrode (VCOM) terminal in the case of LCD.

FIG. 7 is a diagram illustrating the touch sensor panel 200 and the charge amplifier 510 within the receiver circuit unit 500 according to the embodiment of the present invention.

Referring to FIG. 7, the touch sensor panel 200 is configured to include mutual capacitance $Cm_{ij}$ connected between an i-th Y electrode Yi and a j-th X electrode Xj of the touch sensor panel 200. The driving signal Vdrv is applied to the i-th Y electrode Yi of the touch sensor panel 200, the receiver circuit unit 500 is connected to the j-th X electrode Xj, self-capacitances $C_{SYi}$ and $C_{SXj}$ exist between the flat panel display common electrode VCOM and the Y and X electrodes Yi and Xj, respectively, and the mutual capacitance $Cm_{ij}$ exists between the Y electrode Yi and the X electrode Xj.

Furthermore, since the touch sensor panel 200 needs to measure the mutual capacitance $Cm_{ij}$, a charge amplifier may be used at the first stage of the receiver circuit unit 500. Furthermore, a capacitor Cf is used as a feedback element for connecting an inverting input terminal and an output terminal of the charge amplifier. When a resistor is used as the feedback element, the feedback element may operate as a differential circuit to significantly amplify high-frequency noise. On the other hand, the charge amplifier may operate as a linear amplifier which does not significantly amplify high-frequency noise. Thus, the charge amplifier has an excellent noise characteristic.

Figure 8:
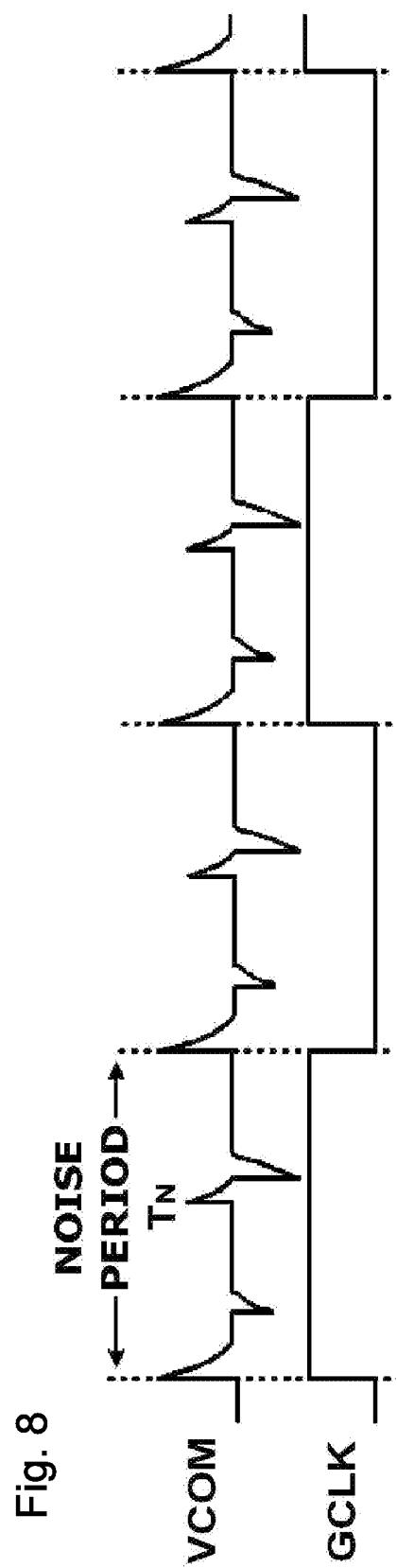
FIG. 8 is a diagram illustrating noise occurring in a general LCD common electrode (VCOM) and a clock signal GCLK of a gate driver line.

In the mutual capacitance measuring touch sensor having the above-described configuration according to the embodiment of the present invention, the waveform of VCOM noise self-generated from the flat panel display 100 has a time-periodic characteristic as illustrated in FIG. 8. FIG. 8 illustrates the case in which the period $T_N$ of the VCOM noise corresponds to the half of the period of the gate driver clock signal GCLK. When such a characteristic is used, the period of the reset signal Vrst used in the receiver circuit unit 500 may be set to a positive integer multiple of the VCOM noise period. Then, the influence of VCOM noise appearing in the output of the receiver circuit unit may be equalized regardless of at which position (ij combination) of the touch sensor panel the VCOM noise is measured. Furthermore, since the VCOM noise becomes a constant DC value regardless of i and j values, the VCOM noise may be easily removed.

Figure 9:
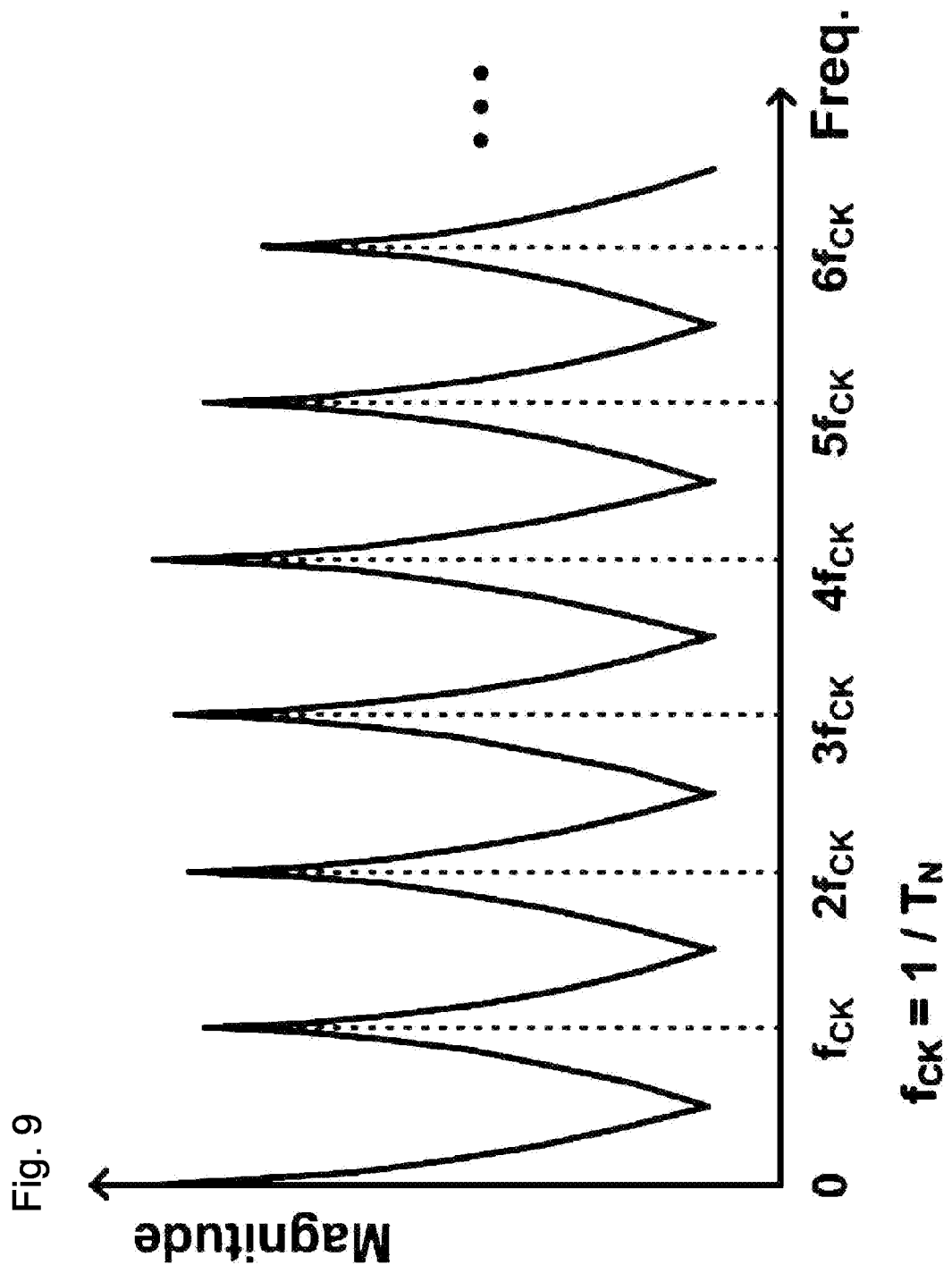
FIG. 9 illustrates the frequency spectrum of the VCOM noise of FIG. 8.

FIG. 9 illustrates the frequency spectrum of the VCOM noise of FIG. 8. Referring to FIG. 9, the VCOM noise has a high value at each integer multiple of the reciprocal $f_{CK}$ of the noise period $T_N$, due to a harmonic component.

Figure 10:
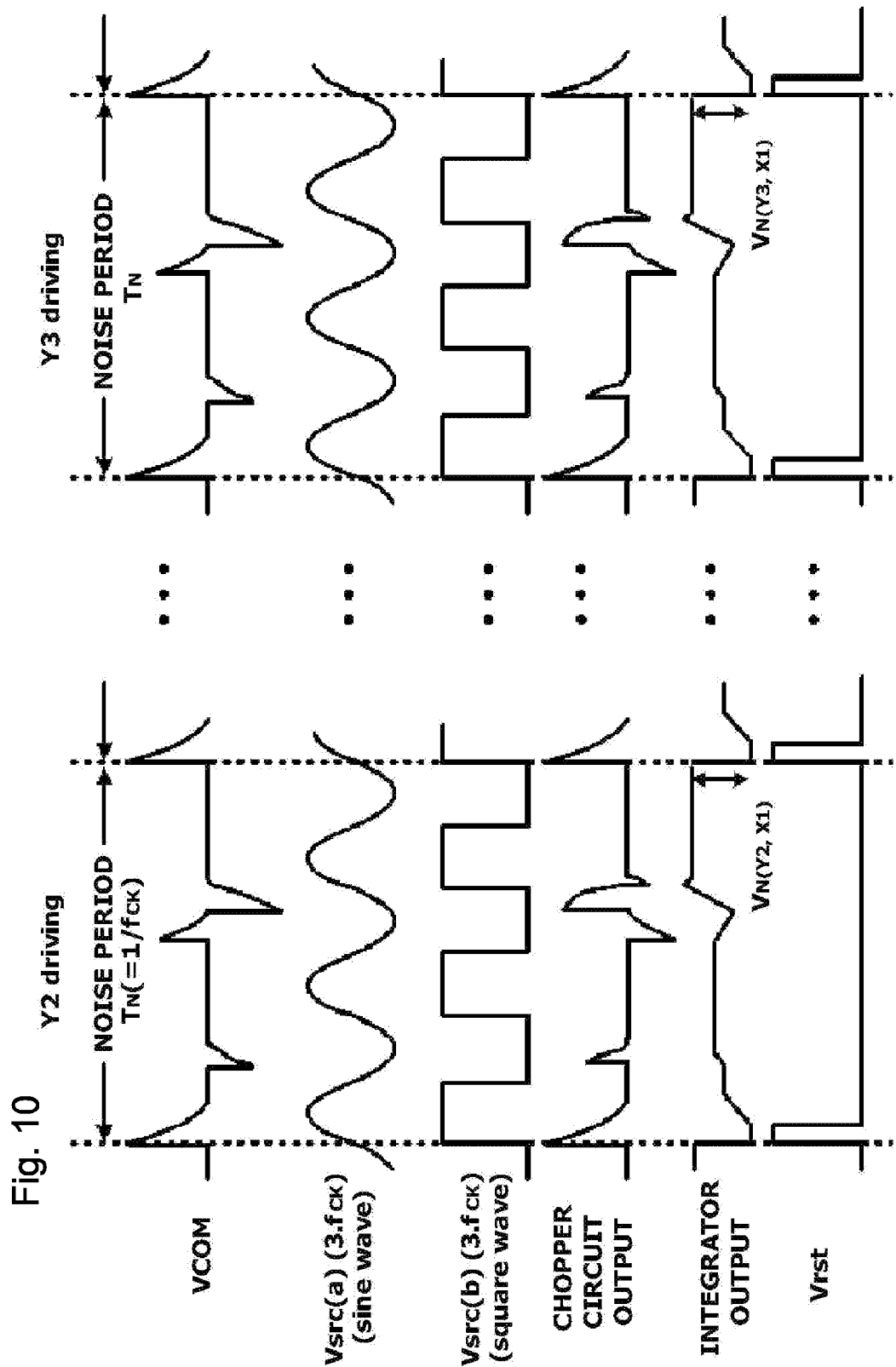
FIG. 10 illustrates that an output signal Vsrc of the driving clock connector is synchronized with VCOM noise such that the influence of the VCOM noise appearing in the final output of the receiver circuit unit is the same at any position of the touch sensor panel.

FIG. 10 illustrates that the influence of VCOM noise appearing in the final output of the receiver circuit unit is the same at any position of the touch sensor panel, when the frequency of the output signal Vsrc used for generating the touch sensor panel driving signal Vdrv is set to a positive integer multiple of the reciprocal of the VCOM noise period and the period of the reset signal Vrst is equalized to the noise period.

FIG. 10 illustrates the case in which the frequency of the output signal Vsrc used for generating the touch sensor panel driving signal Vdrv of the driver 300 corresponds to a positive integer multiple of the reciprocal $f_{CK}$ of the VCOM noise period. That is, the frequency of the output signal Vsrc is three times larger than the reciprocal $f_{CK}$ of the VCOM noise period. The output signal Vsrc may include a square wave Vsrc(b) as well as a sine wave Vsrc(a). At first, an output value $V_{N(X1, Y2)}$ of the receiver circuit unit 500, which is measured at a line X1 through integration during one period of the VCOM noise at the time at which the driver 300 drives a line Y2 of the touch sensor panel 200 of FIG. 6, is equal to an output value $V_{N(X1, Y3)}$ of the receiver circuit unit 500, which is measured at the line X1 through integration during one period of the VCOM noise at the time at which the driver 300 drives a line Y3 of the touch sensor panel 200 after time passes. This is because, since the period of the reset signal Vrst is a positive integer multiple of the VCOM noise period and the frequency of the output signal Vsrc is a positive integer multiple of the reciprocal of the VCOM noise period, the output of the chopper circuit always has an equal value at the same time point in one period of the VCOM noise. When a delay time occurring while the driving signal of the touch sensor panel 200 propagates through the line Y1 of FIG. 6 is ignored and VCOM noises induced in all X lines of FIG. 6 through the self-capacitance from the common electrode (VCOM) plane in the touch sensor panel 200 are equal to each other, the influences of the VCOM noises on the output signal of the receiver circuit unit 500 are equal to each other. That is, the output voltage $V_{N(X1, Yj)}$ of the receiver circuit unit 500, which corresponds to the influence of the VCOM noise measured at a line Xj through integration during one period of the VCOM noise period at the time at which the driving signal is applied to a line Yi of FIG. 6, has the same value with respect to all i and j values.

In general, a chopper method is frequently used to measure a weal signal combined with high noise. The mutual capacitance measuring touch sensor according to the embodiment of the present invention is different from other mutual capacitance measuring touch sensors in that a second chopper circuit is added to a single chopper circuit so as to form a dual chopper circuit, and the period of a chopper signal Vchop of the second chopper circuit is set to a positive integer multiple of the VCOM noise period. In the preset embodiment, since no chopper circuit is used in the driver 300 but a chopper circuit is used only in the receiver circuit unit 500, the structure of the capacitive touch sensor is close to a mixed structure. However, since the same driving signal Vsrc is used as a driving signal used in the driver 300 and a chopper driving signal used in the receiver circuit unit 500, the same function as the chopper may be performed. Thus, the above-described method may be referred to as a chopper method or analog multiplier method, and the chopper method and the analog multiplier method may be used together. However, in order to prevent confusion between names indicating hardware components throughout the following specification, the first analog multiplier may be referred to as an analog multiplier, and the second analog multiplier may be referred to as a chopper circuit.

FIG. 11 is a diagram illustrating a touch sensor circuit which includes an analog multiplier applied to the receiver circuit unit 500 and uses an output signal Vsrc having a frequency corresponding to a positive integer multiple or (positive integer multiple+0.5) of the reciprocal of the period of VCOM noise.

Referring to FIG. 11, the mutual capacitance measuring touch sensor according to the embodiment of the present invention is configured in such a manner that the driving signal Vdrv is applied to an i-th Y electrode Yi of the touch sensor panel 200 and the charge amplifier 510 is coupled to a j-th X electrode Xj. In FIG. 11, $C_{SYi}$ and $C_{SXj}$ represent self-capacitances of the Yi electrode and the Xj electrode with respect to the VCOM surface, and $Cm_{ij}$ represents mutual capacitance between the Yi electrode and the Xj electrode. The analog multiplier 530 and the integrator 520 are connected in series to an output terminal of the charge amplifier 510. At this time, VCOM noise is inputted to the charge amplifier 510 the self-capacitance $C_{SXi}$.

Figure 13:
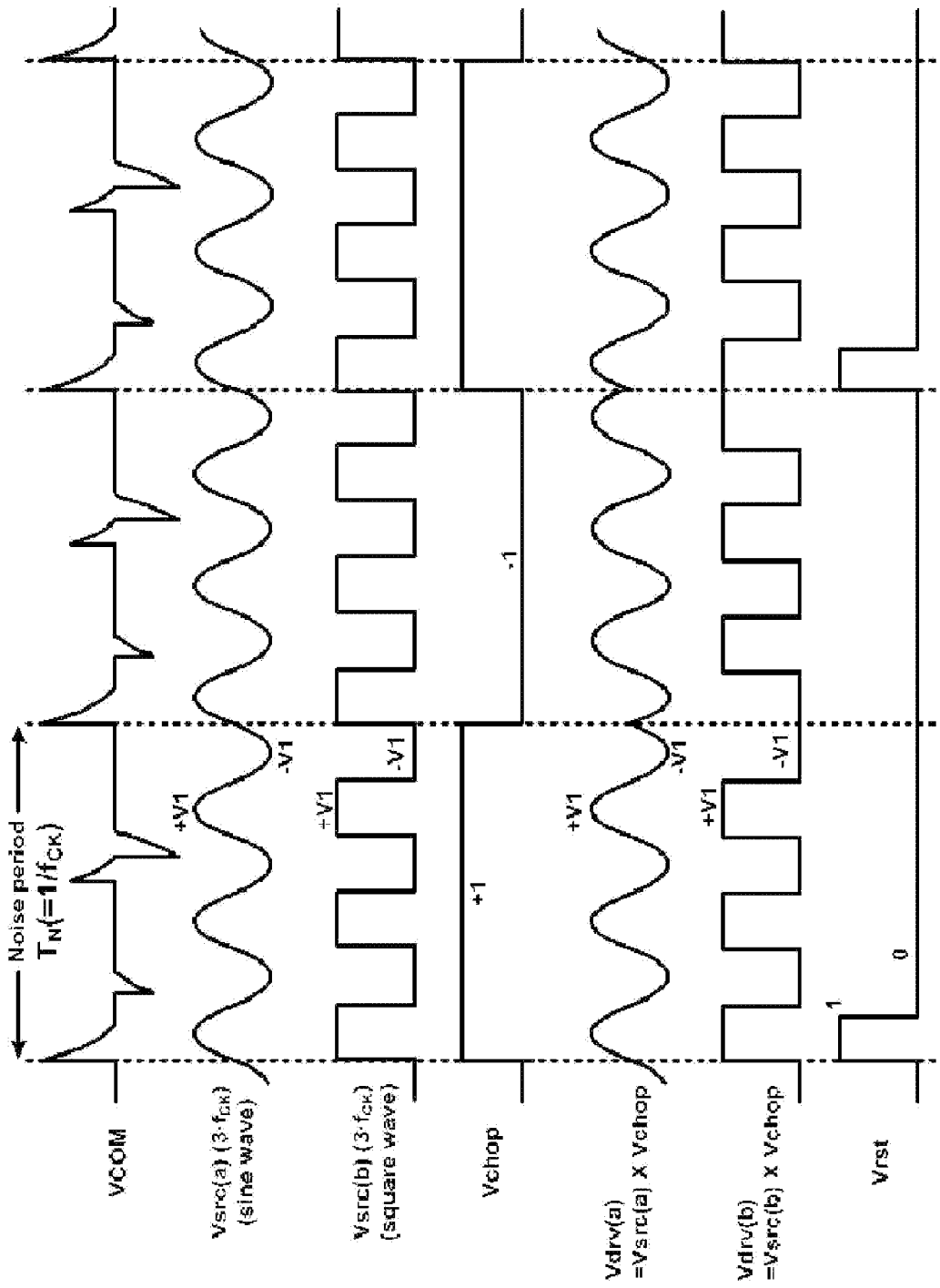
FIG. 13 illustrates waveforms used in the synchronized analog multiplier of FIG. 12, showing the case in which the period of signals Vchop and Vrst is two times larger than the period of the VCOM noise and the period of a signal Vsrc is three times larger than the reciprocal of the period of the VCOM noise.
Figure 14:
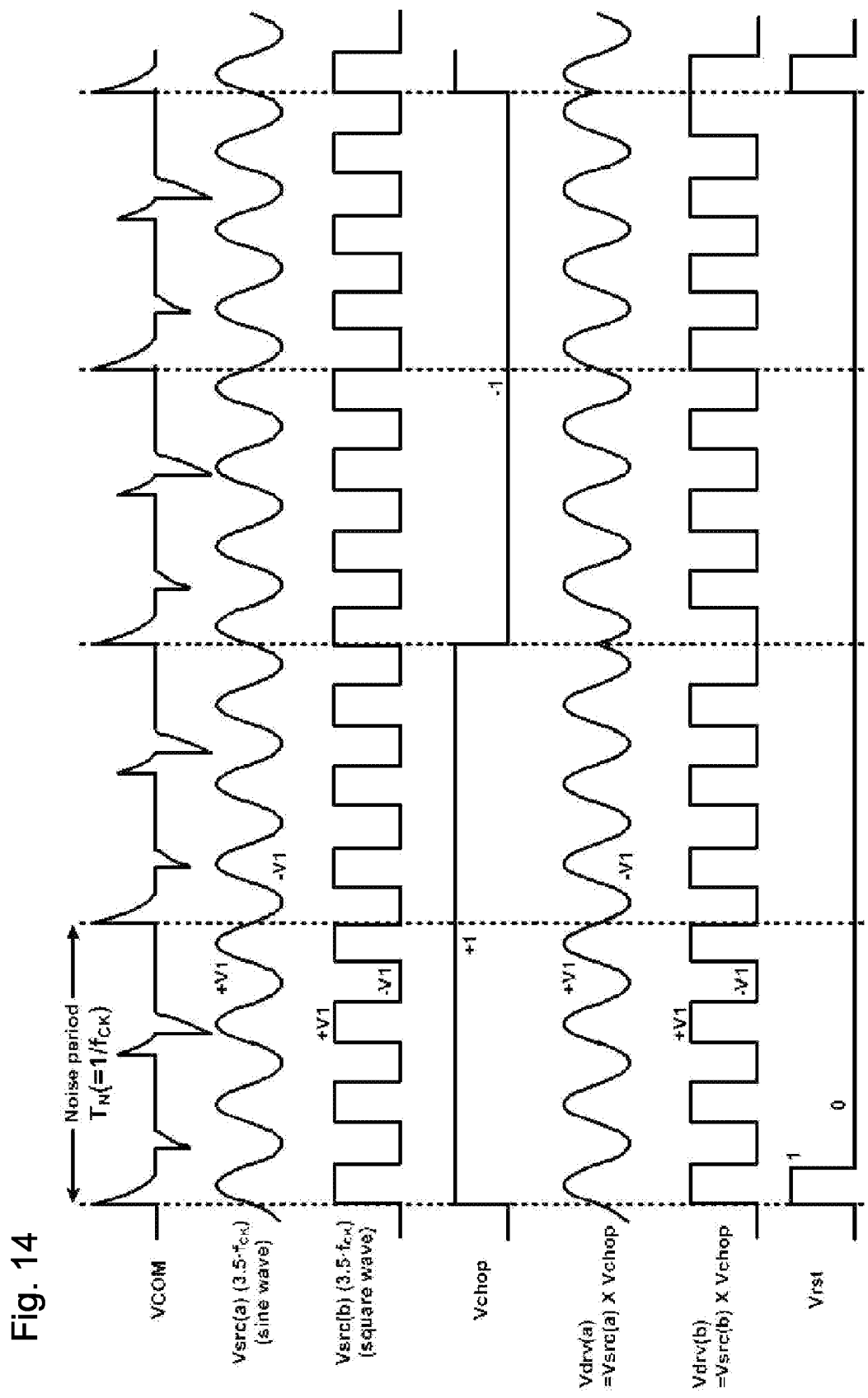
FIG. 14 illustrates waveforms used in the synchronized analog multiplier of FIG. 12, showing the case in which the period of signals Vchop and Vrst is four times larger than the period of the VCOM noise and the period of a signal Vsrc is 3.5 times larger than the reciprocal of the period of the VCOM noise.

FIG. 12 is a diagram illustrating a touch sensor circuit which includes an analog multiplier 530 and a chopper circuit 540 applied to the receiver circuit unit 500 and uses an output signal Vsrc having a frequency corresponding to a positive integer multiple or (positive integer multiple+0.5) of the reciprocal of the period of VCOM noise and a chopper signal Vchop having a period corresponding to an even multiple of the VCOM noise period. FIGS. 13 and 14 illustrate the waveforms of signals used in the touch sensor circuit of FIG. 12.

The single chopper circuit illustrated in FIG. 11 may reduce the influence of VCOM noise appearing in the output of the receiver circuit unit 500 as the frequency of the chopper driving signal Vsrc is increased. However, when the frequency of the chopper driving signal Vsrc is increased, the phases of two signals multiplied in the chopper may differ from each other, due to the delay time which occurs while the signals are transmitted through transparent electrodes of the touch sensor panel. In this case, since synchronization may not be normally achieved, the value of the output signal of the receiver circuit unit 500 may be decreased. Thus, in order to minimize the influence of the VCOM noise in the touch sensor output signal while maintaining the frequency of the driving signal Vsrc at a low value, the dual chopper circuit may be proposed according to the embodiment of the present invention. The dual chopper circuit performs a chopper operation based on the dual structure, using a digital signal referred to as a chopper signal Vchop and having a period corresponding to an even multiple of the VCOM noise period, in addition to the driving signal Vsrc.

FIG. 13 illustrates the waveforms of the signals in the case where the period of the chopper signal Vchop is two times larger than the VCOM noise period and the frequency of the driving signal Vsrc is three times larger than the reciprocal of the VCOM noise period. During one period of the VCOM noise, the chopper signal Vchop becomes '+1', the driving signal Vdrv of the touch sensor panel becomes +Vsrc, and the receiver circuit unit uses +Vsrc as a chopper driving signal. During the next one period of the VCOM noise, the chopper signal Vchop becomes '−1', the driving signal Vdrv of the touch sensor panel becomes −Vsrc, and the receiver circuit unit uses −Vsrc as a chopper driving signal. Here, '+1' and '−1' represent the effect of phase inversion of the chopper signal Vchop. Thus, the chopper driving signal Vsrc is inputted to the integrator 520 of the receiver circuit unit 500 through the chopper operation while having the same phase at all times. However, during two periods of the VCOM noise, the VCOM noises are inputted to the integrator 520 of the receiver circuit unit 500 so as to offset each other. The charge amplifier and the integrator of the receiver circuit unit 500 are reset at every two periods of the VCOM noise according to the reset signal Vrst, and perform an integration operation during two periods of the VCOM noise, corresponding to the time period between two adjacent reset operations of the charge amplifier 510 and the integrator 520. The reset signal Vrst is synchronized with the chopper signal Vchop, and has the same period as the chopper signal Vchop. In the above-described dual chopper method, the receiver circuit unit 500 adds the influence of the VCOM noise during one period of the VCOM noise, and subtracts the influence of the VCOM noise during the next one period of the VCOM noise, through the chopper circuit operation based on the characteristic that the waveform of the VCOM noise is periodically repeated. Thus, the influence of the VCOM noise in the output of the receiver circuit unit 500 may be minimized.

FIG. 13 illustrates the case in which the frequency of the driving signal Vsrc is three times larger than the reciprocal of the VCOM noise period. As illustrated in FIG. 14, however, when the frequency of the driving signal Vsrc corresponds to (positive integer multiple+0.5) of the reciprocal of the VCOM noise period, that is, when the frequency of the driving signal Vsrc is 3.5 times larger than the reciprocal of the VCOM noise period, the phase of the driving signal Vsrc applied during one period of the VCOM noise and the phase of the driving signal Vsrc applied during another period adjacent to the one period have a difference of 180 degrees therebetween. Thus, when the frequency of the driving signal Vsrc corresponds to (positive integer multiple+0.5) of the reciprocal of the VCOM noise period, the driving signals Vsrc having the same phase are added during the two periods of the VCOM noise and the VCOM noise components are offset during the two periods of the VCOM noise, through the operations of the multiplier 530 and the integrator 520, as long as the chopper signal Vchop is maintained in a DC state of '+1'. The case in which the chopper signal Vchop is maintained at '+1' corresponds to the case in which the chopper circuit 540 driven by the chopper signal Vchop is not used. Thus, when the frequency of the driving signal Vsrc is set to (positive integer multiple+0.5) of the reciprocal of the VCOM noise period, the effect of the dual chopper circuit of FIG. 12 may be obtained through the configuration of the single chopper circuit of FIG. 11. When the periods of the chopper signal Vchop and the reset signal Vrst are set to be four times larger than the VCOM noise period (FIG. 14) unlike the case in which the periods are two times larger than the VCOM noise period (FIG. 13), or when the frequency of the driving signal Vsrc is set to a positive integer period or (positive integer multiple+0.5) of the reciprocal of the VCOM noise period, the dual copper circuit of FIG. 12 may be used to offset the influence of the VCOM noise. For this operation, k in FIG. 22 may set to an even number.

Thus, even when the frequency of the driving signal Vsrc is relatively low, the influence of the VCOM noise in the output of the receiver circuit unit may be significantly reduced. Even when the period of the chopper signal Vchop is four times larger than the VCOM noise period or corresponds to an even multiple of the VCOM noise period, for example, four or more, the period of the reset signal Vrst may be equalized to the period of the chopper signal Vchop. In this case, the operation time of the charge amplifier and the integrator of the receiver circuit unit is equal to the period of the chopper signal Vchop.

Figure 15:
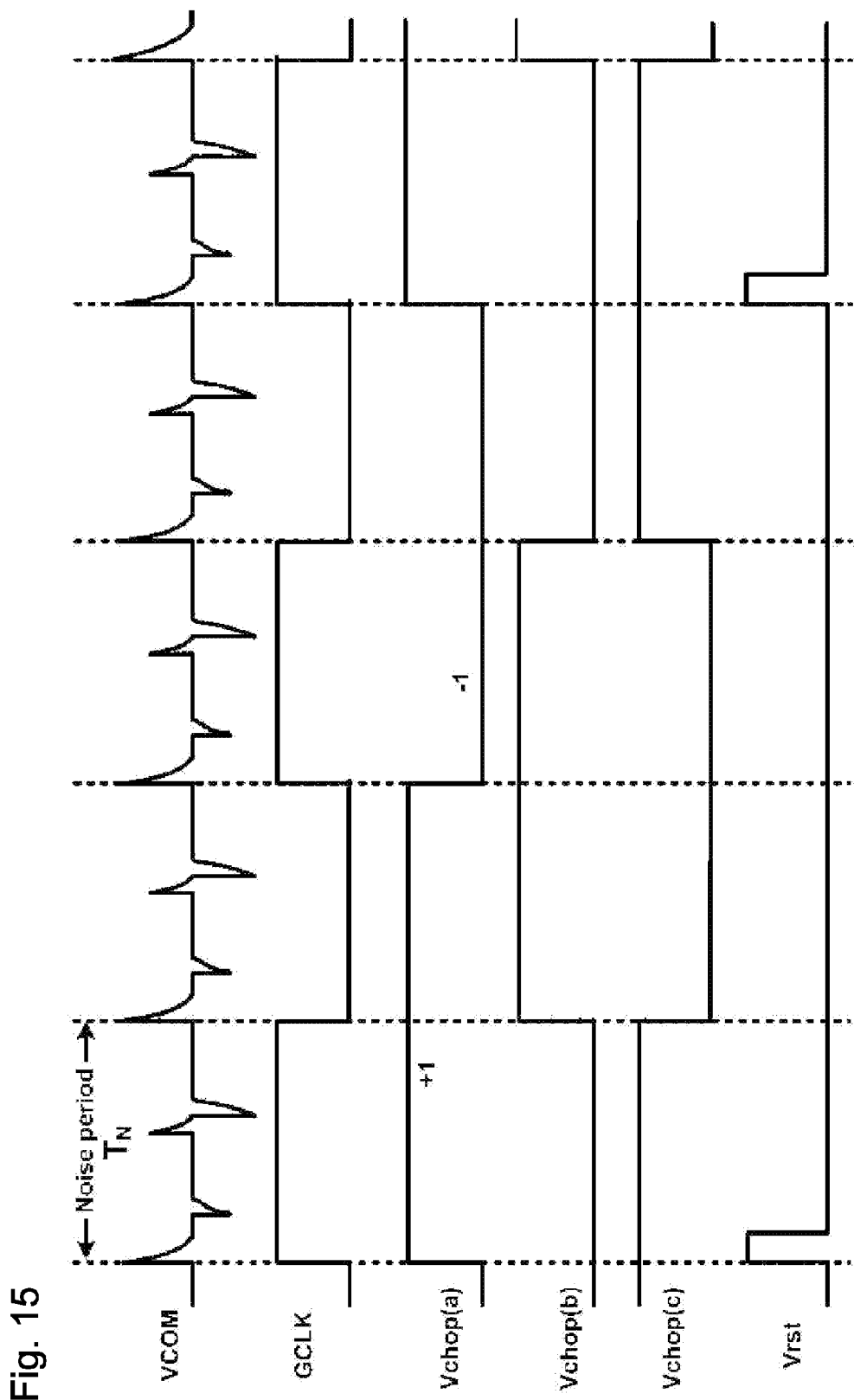
FIG. 15 illustrates various combinations of the driving signal Vchop used in the synchronized analog multiplier of FIG. 12 and a reset signal Vrst for resetting a charge amplifier and an integrator.

FIG. 15 illustrates the case in which the reset signal Vrst and the chopper signal Vchop in the charge amplifier and the integrator of the receiver circuit unit have a period four times longer than the VCOM noise period. The chopper signal Vchop may be configured to have various combinations (++--, -++-, +--+ and the like) depending on the position of the reset signal Vrst. In this case, the data throughput of the touch sensor circuit becomes two times slower than in the case in which the periods of the reset signal Vrst and the chopper signal Vchop are two times larger than the VCOM noise period. However, since the integration time is doubled, the SNR of the output signal of the touch sensor circuit may be increased by 3 dB. Furthermore, when the frequency of the driving signal Vsrc serving as an output signal of the driving clock generator corresponds to a positive integer period or (positive integer multiple+0.5) of the reciprocal of the VCOM noise period, the chopper operation may be performed to reduce the influence of the noise in the receiver circuit unit.

In addition to the above-described method, the present invention proposes a noise compensation method which extracts the voltage waveform of the common electrode VCOM having self-generated noise information of the flat panel display, and applies the extracted waveform to the receiver circuit unit so as to compensate for the VCOM noise, in order to increase the SNR of the charge amplifier output signal Vamp without increasing the amplitude of the touch sensor panel driving signal Vdrv to a large value.

Figure 16:
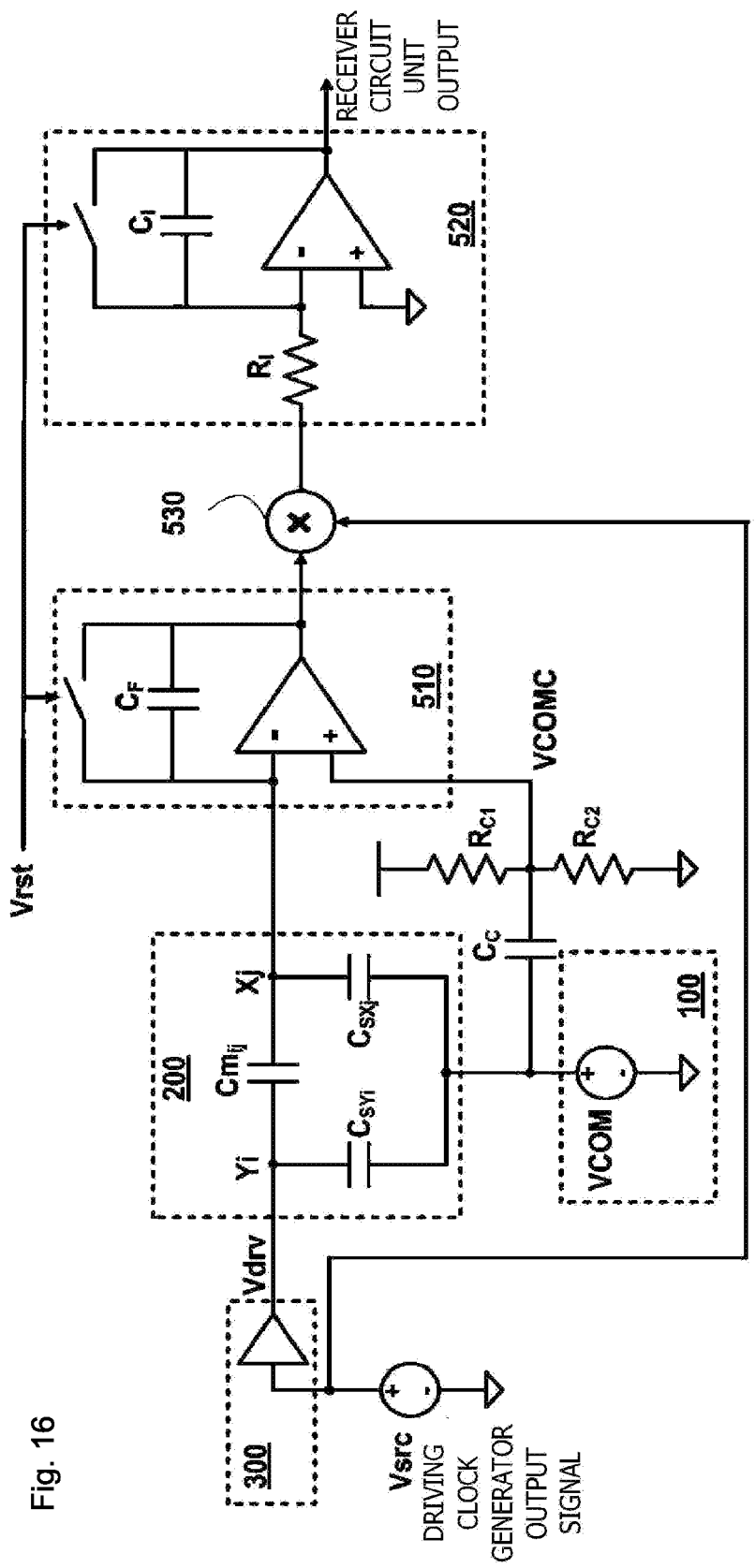
FIG. 16 is a diagram illustrating a touch sensor circuit including a receiver circuit unit to which a method for compensating for self-generated noise of the flat panel display through AC coupling is applied.

FIG. 16 is a diagram illustrating a touch sensor circuit including the receiver circuit unit to which the VCOM noise compensation method is applied.

In LCD, a common electrode (VCOM) voltage has a waveform to which an impulse noise waveform is added on the basis of a DC voltage of 5V, for example (refer to FIG. 8).

Referring to FIG. 16, the charge amplifier of the receiver circuit unit 500 according to the embodiment of the present invention extracts the waveform of VCOM noise using an AC (capacitive) coupling method in which one capacitance Cc and two resistors $R_{C1}$ and $R_{C2}$ are connected in parallel, and applies the extracted waveform VCOMC to the analog multiplier 530 coupled to the non-inverting input terminal and the output terminal of the charge amplifier 510 of the receiver circuit unit 500, because an input common mode voltage has a different value from the DC voltage of the common electrode VCOM of the flat panel display. In FIG. 16, in order to reliably extract the waveform of the VCOM noise through the AC coupling method, the time constant of the AC coupling circuit, that is, $Cc \cdot (R_{C1} \| R_{C2})$ needs to be much larger than the reciprocal of the maximum frequency of the VCOM noise waveform. When the VCOM noise compensation method of FIG. 16 is performed, the output signal Vamp of the charge amplifier may be expressed by Equation 1 below.

$$V_{AMP} = -\frac{Cm}{C_F}Vdrv + VCOMC \qquad [\text{Equation 1}]$$

Here, VCOMC represents a signal obtained by extracting the waveform of the VCOM noise through the AC coupling method. The DC level is different from the VCOM noise, and the AC level is equal to the VCOM noise. Since the VCOM noise is not completely removed in Equation 1, the VCOMC voltage is applied to the reference voltage terminal of an input signal coupled to the output terminal of the charge amplifier, between two input signals of the analog multiplier coupled to the output of the charge amplifier in the receiver circuit unit 500, and (Vamp−VCOMC) signal and the driving signal Vsrc are multiplied by the analog multiplier 530. Then, the receiver circuit unit 500 may remove the influence of the VCOM noise which is the self-generated noise of the flat panel display.

Figure 17:
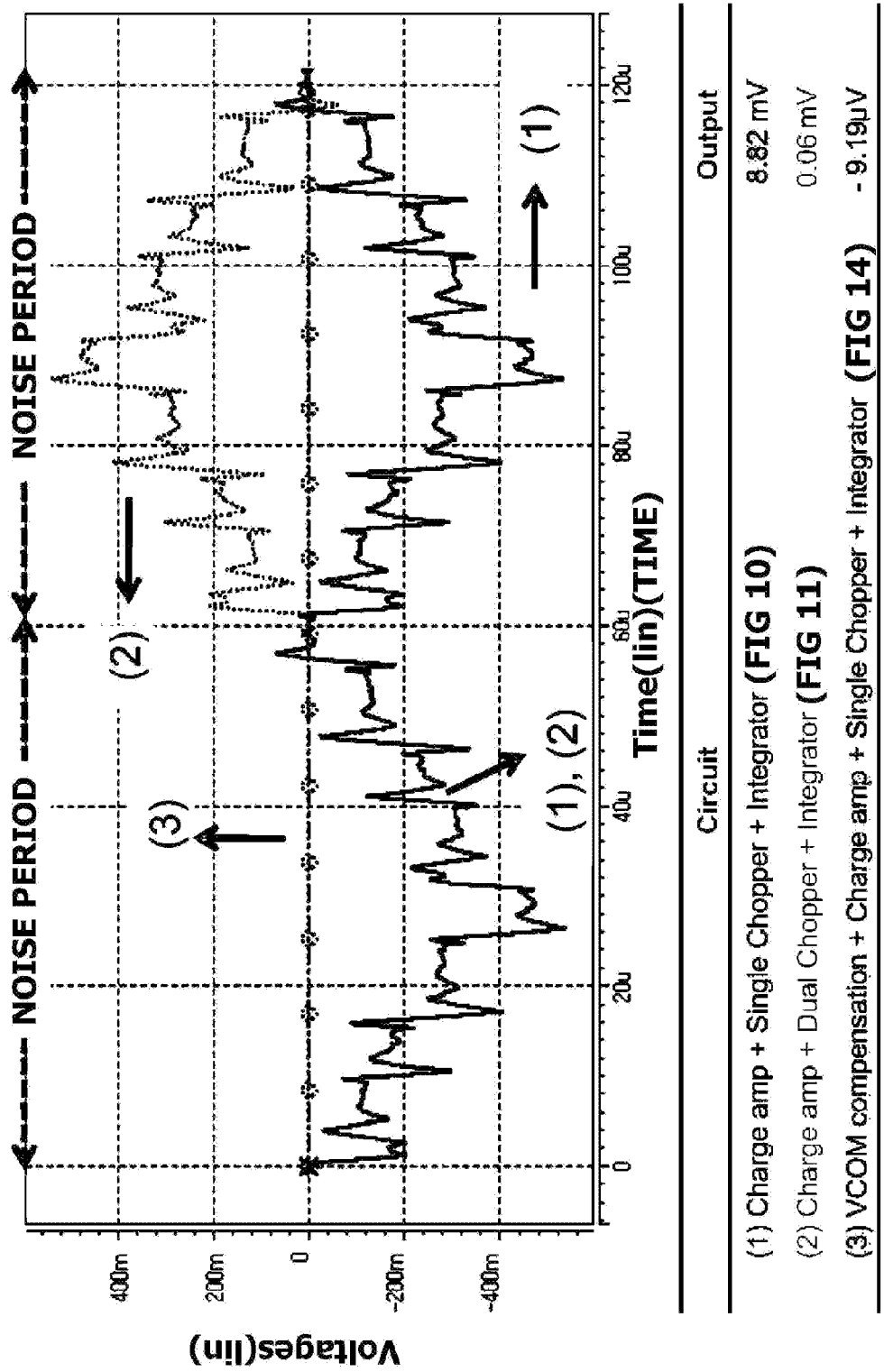
FIG. 17 is diagram illustrating SPICE simulation results of the circuits of FIGS. 11, 12, and 16.

FIG. 17 is a diagram illustrating SPICE simulation results of the circuits of FIGS. 11, 12, and 16.

In order to observe only noise components, the touch sensor panel driving signal of the driver 300 was set to zero. The period TN of VCOM noise used in the simulation is 60.9 μs. For the three cases (FIGS. 11, 12, and 16), the simulation was performed during two periods (2TN) of the VCOM noise, and output values of the integrator were compared.

The period of the chopper signal Vchop for driving the chopper circuit 540 of FIG. 12 was set to the double of the VCOM noise period TN. The reset signal Vrst for resetting the charge amplifier and the integrator was set to zero to turn off the reset switches of the charge amplifier and the integrator.

As for the parameters used in the SPICE simulation, the self-capacitances $C_{SXj}$ and $C_{SYi}$ of the X electrode and the Y electrode are 100 pF, the mutual capacitance $Cm_{ij}$ is 1 pF, the feedback capacitor $C_F$ of the charge amplifier is 3 pF, and the integrator resistor $R_I$ and the integrator capacitor $C_I$ are 440 kΩ and 40 pF, respectively.

The capacitor Cc used in the AC coupling circuit of FIG. 16 is 500 nF, and the resistors $R_{C1}$ and $R_{C2}$ are 200 kΩ. The frequency of the driving signal Vsrc of the first analog multiplier is 23 times larger than the reciprocal of the period TN of the VCOM noise, that is, about 368 kHz. The amplifiers used in the charge amplifier and the integrator may include an ideal OP amplifier having a voltage gain of 100, and a behavior model with the Verilog-A language may be used as the analog multiplier.

FIG. 17 illustrates the waveforms of the SPICE simulations for the above-described three methods. The final output values of the receiver circuit units of the single chopper circuit of FIG. 10, the dual chopper circuit of FIG. 12, and the VCOM noise compensation circuit of FIG. 16 are 8.82 mV, 0.06 mV, and −9.19 μV, respectively. Under this simulation condition, the VCOM noise compensation circuit (refer to FIG. 16) has the most excellent noise characteristic, and the dual chopper circuit (refer to FIG. 12) has the second most excellent noise characteristic.

Figure 18:
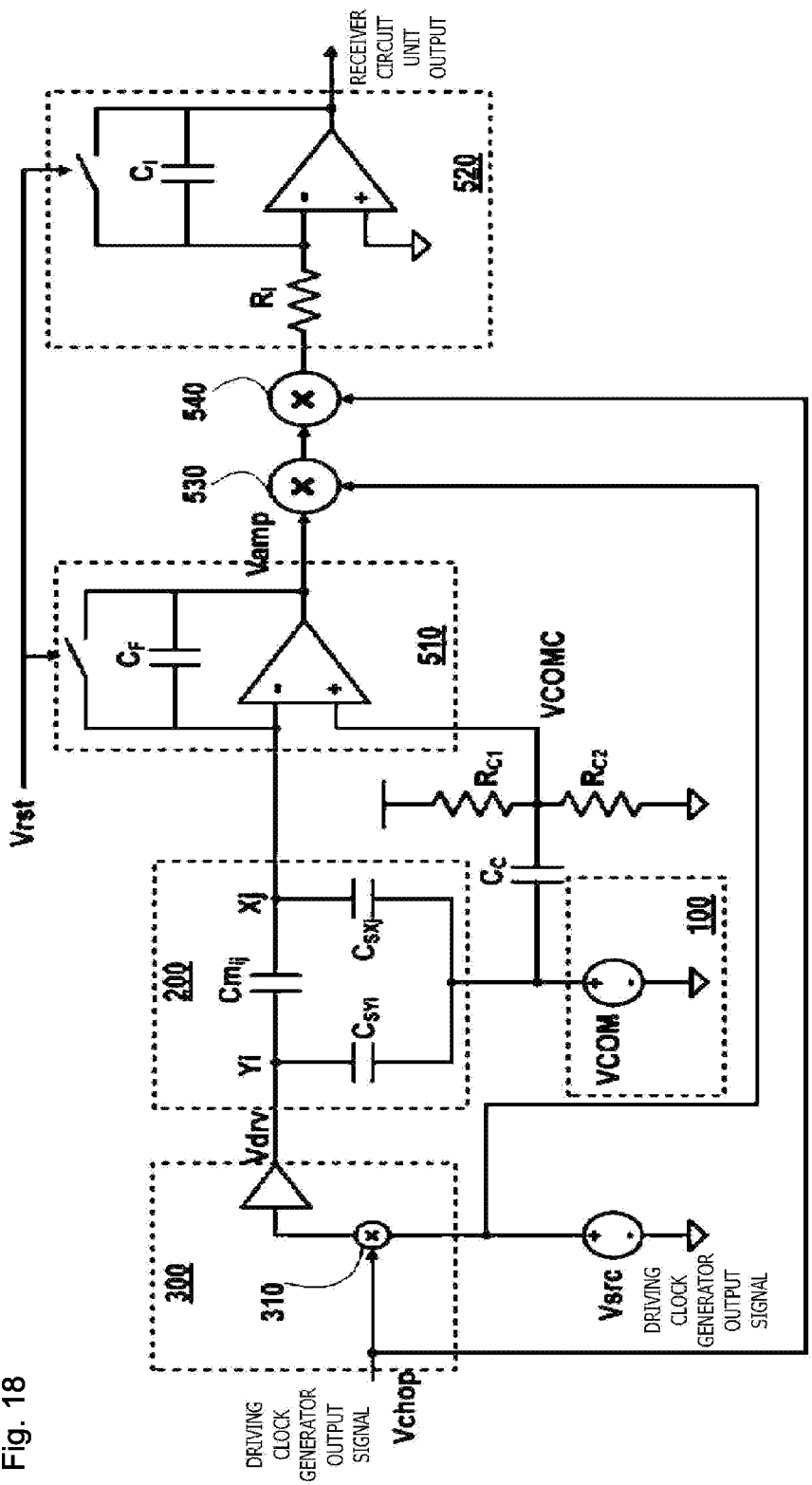
FIG. 18 is a touch sensor circuit to which the VCOM noise compensation method according to the embodiment of the present invention is applied.

FIG. 18 is a touch sensor circuit to which the VCOM noise compensation method according to the embodiment of the present invention is applied.

The receiver circuit unit 500 includes a charge amplifier 510, an analog multiplier 530, a chopper circuit 540, and an integrator 520.

In order to compensate for VCOM noise in the receiver circuit unit 500, a VCOM noise signal of the flat panel display is coupled to the non-inverting input terminal of the charge amplifier and the reference voltage terminal of an input signal coupled to an output terminal of the charge amplifier between two input signals of the analog multiplier 530, through AC coupling. A driving signal of the analog multiplier 530 is represented by Vsrc, and a driving signal of the chopper circuit 540 is represented by Vchop. The driving signals Vsrc and Vchop are generated through the driving clock generator 400 of FIG. 5. The driving signal Vsrc is a square-wave or sine-wave periodic signal synchronized with the waveform of the VCOM noise, and the driving signal Vchop is a digital signal synchronized with the waveform of the VCOM noise. The driving signal Vchop has a period corresponding to an even multiple of the period TN of the VCOM noise. The driver 300 generates a touch sensor panel driving signal Vdrv by multiplying the driving signals Vsrc and Vchop through a third chopper circuit 310.

Figure 19:
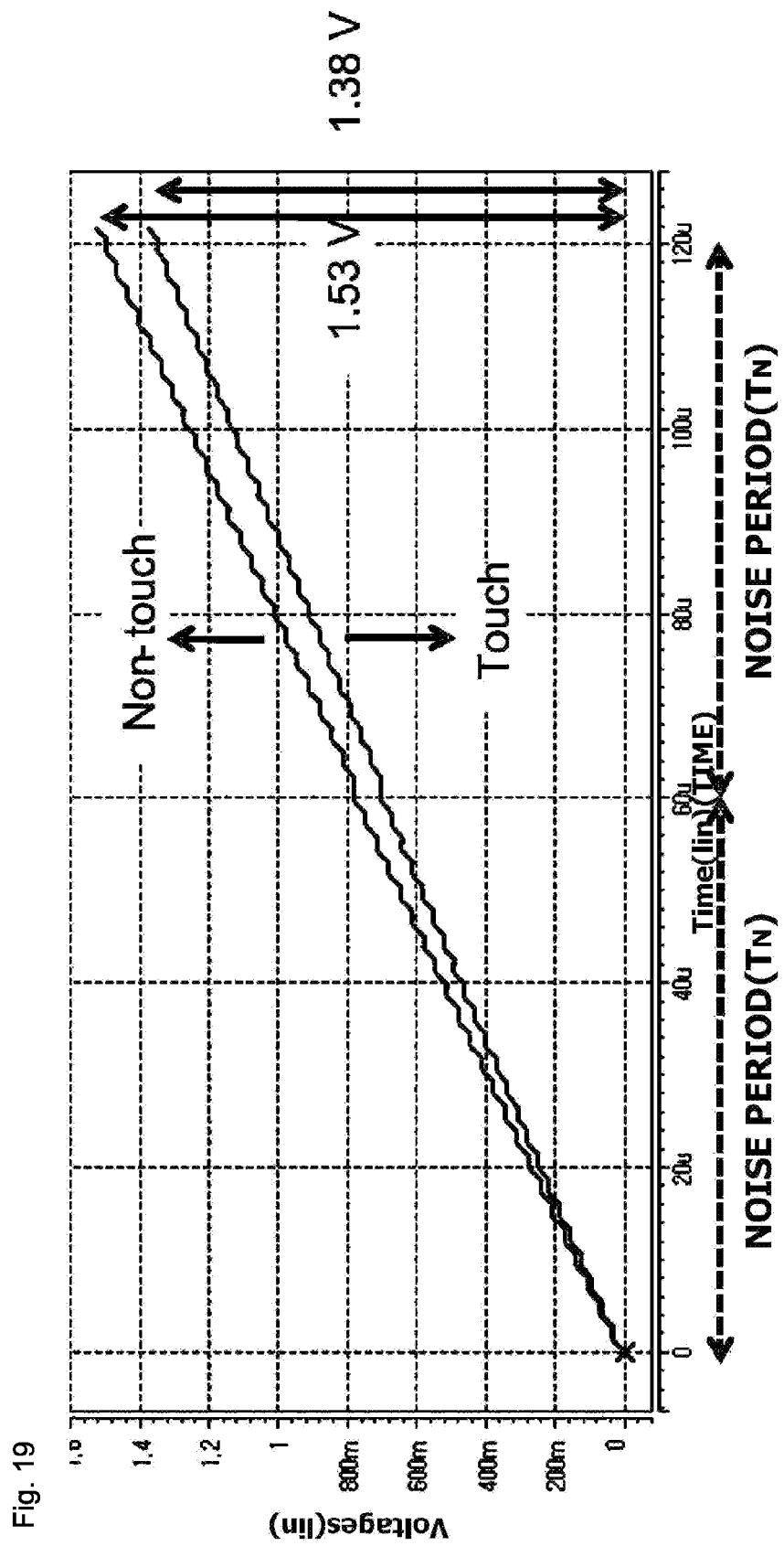
FIG. 19 illustrates SPICE simulation results of the circuit of FIG. 18.

FIG. 19 illustrates SPICE simulation results for the case in which a touch occurred and the case in which no touch occurred, in a state where VCOM noise is applied to the circuit of FIG. 18.

The mutual capacitance $Cm_{ij}$ was set to 1.0 pF when no touch occurred, and 0.9 pF when a touch occurred. Furthermore, the final output voltage of the receiver circuit unit was 1.53V when no touch occurred, and 1.38V when a touch occurred. The final output voltages have a difference of 10% like the mutual capacitances. The simulation results of FIG. 19 indicate that the influence of the VCOM noise induced from the LCD was almost removed in the output of the receiver circuit unit of the touch sensor circuit. In the simulation of FIG. 19, the touch sensor panel driving signal Vdrv, the second chopper driving signal Vchop, and the parameters $C_F$, $R_I$, $C_I$, $C_C$, $R_{C1}$, and $R_{C2}$ may be set in the same manner as illustrated in FIG. 17.

As illustrated in FIG. 19, the output signal of the receiver circuit unit 500 in the case where a touch occurred and the output signal of the receiver circuit unit 500 in the case where no touch occurred have a small difference (for example, 5 to 15%). Thus, the dynamic range of the output signal is limited to about 1.05 to 1.15. This is because the output voltage of the receiver circuit unit in the mutual capacitance measuring touch sensor is proportional to the mutual capacitance Cm (refer to FIG. 5), and the mutual capacitance Cm is changed in the range of 5 to 15% between when a touch occurred and when no touch occurred.

In the present embodiment, an output signal compensator 700 (refer to FIG. 20) is added to the receiver circuit unit 500. While the touch sensor is not touched at the initial time, for example, immediately after power is turned on, the output signal compensator 700 is operated. The output signal compensator 700 calibrates the receiver circuit unit 500 so as to minimize the output value of the receiver circuit unit 500 to a value close to zero, and stores the result value of the calibration as a digital code.

After the calibration process is ended, the output signal compensator 700 is turned off, and the digital code obtained during the calibration process is used to continuously maintain the receiver circuit unit 500 in the same state as the state in which the calibration is completed. Therefore, even after the calibration is ended, the output voltage of the touch sensor continuously maintains the minimum value close to zero, when no touch occurs. Thus, the gain of the receiver circuit unit 500 may be significantly increased in such a manner that the output voltage of the receiver circuit unit 500 has a considerably larger value than in the case of FIG. 19, when a touch occurs.

Figure 20:
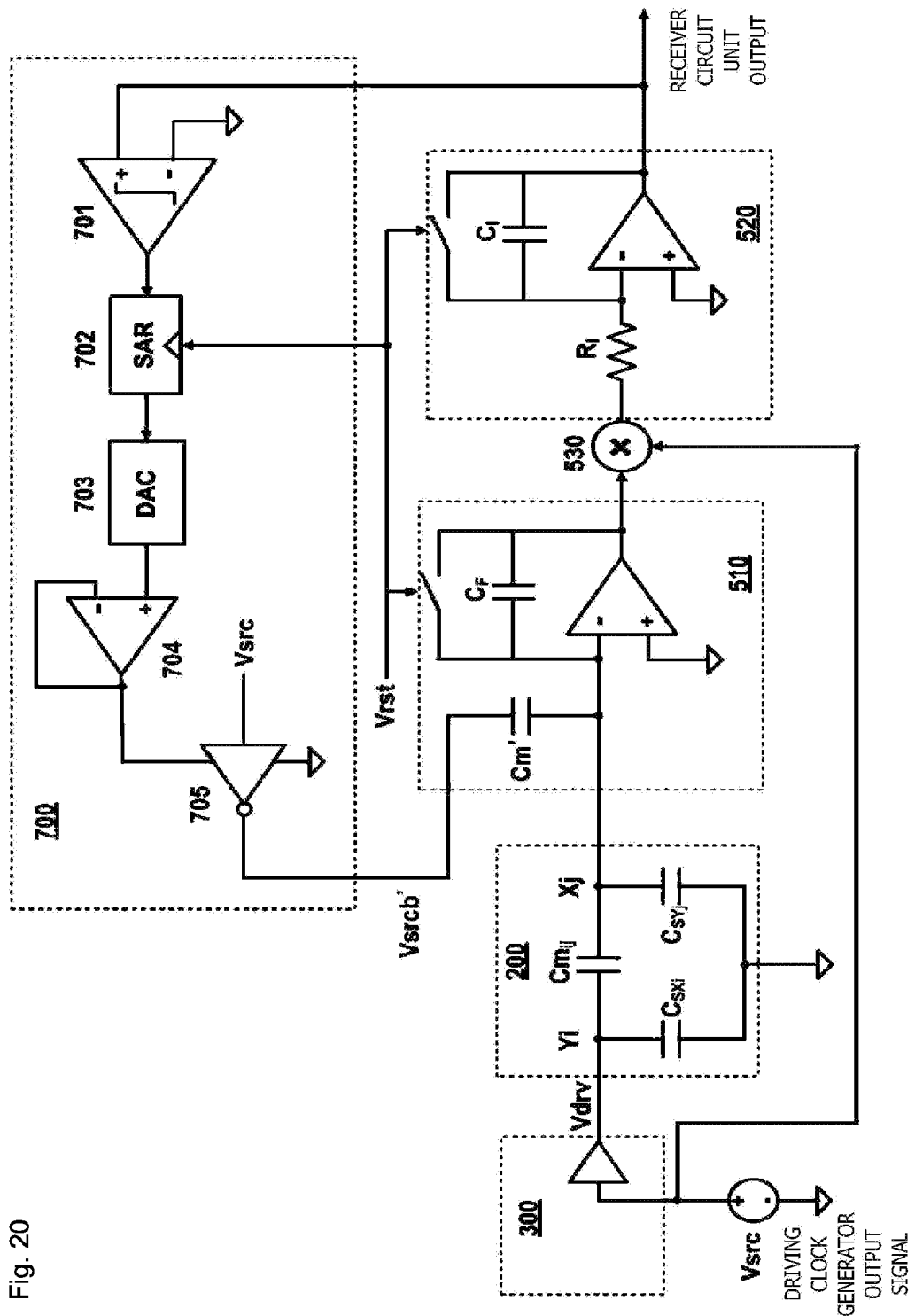
FIG. 20 is a diagram illustrating a touch sensor circuit which additionally includes a circuit for increasing the output dynamic range of the receiver circuit unit of the capacitive touch sensor according to the embodiment of the present invention.

FIG. 20 is a detailed circuit diagram of the output signal compensator 700 for increasing the output dynamic range of the receiver circuit unit 500. Referring to FIG. 20, a compensation capacitor $Cm_{ij}'$ is added to the receiver circuit unit, one terminal of the compensation capacitor $Cm_{ij}'$ is coupled to the inverting input terminal of the charge amplifier at the first stage of the receiver circuit unit 500, and a compensation signal Vsrcb' is applied to the other terminal of the compensation capacitor $Cm_{ij}'$. The compensation signal Vsrcb' is an inverted signal of the touch sensor panel driving signal Vsrc. The compensation signal Vsrcb' has a phase difference of 180 degrees from the driving signal Vsrc and a different amplitude from the driving signal Vsrc. The compensation capacitor $Cm_{ij}'$ has an approximate value to the mutual capacitance $Cm_{ij}$. Typically, a slightly larger value than $Cm_{ij}$ (for example, double) may be used. For example, when $Cm_{ij}'$ is set to $2Cm_{ij}$, the amplitude of the compensation signal Vsrcb' becomes the half of the amplitude of the driving signal Vsrc. In this case, when no touch occurs, the output voltage of the receiver circuit unit 500 becomes zero.

In FIG. 20, the compensation signal compensator 700 operates as a negative feedback circuit and adjusts the amplitude of the compensation signal Vsrcb' such that the output voltage becomes close to zero. As illustrated in FIG. 20, the output signal compensator 700 includes a comparator 701, a successive approximation register (SAR) circuit 702, a digital-to-analog converter (DAC) 703, a voltage buffer 704, and an inverter 705.

The SAR circuit 702 uses the reset signal Vrst as a clock signal.

During the calibration period, the digital code is stored as an output of the SAR circuit 702. After the calibration period is ended, the input clock of the SAR circuit is stopped to continuously maintain the digital code of the SAR circuit 702, which is determined during the calibration period. Thus, the compensation signal Vsrcb' is also continuously maintained as the same value.

According to the embodiment of the present invention, the output signal compensator 700 may be arranged to be coupled to the receiver circuit unit 500 through various methods. For example, when the receiver circuit unit 500 is arranged at each X line of the touch sensor panel of FIG. 5, the output signal compensator 700 may be arranged to one-to-one correspond to each of the receiver circuit units 500. However, when the output signal compensator 700 is arranged at each of the receiver circuit units 500, the configuration may increase the semiconductor chip area and the power consumption. In order to overcome such a disadvantage, the output signal compensator 700 may be coupled only to one receiver circuit unit coupled to one X line, and the compensation signal Vsrcb' generated from the output signal compensator 700 may be supplied to the other receiver circuit units coupled to the other X lines. At this time, the compensation capacitor $Cm_{ij}'$ may be added to each of the receiver circuit units 500.

As described above, however, the output signal compensator 700 of FIG. 20 may be coupled to a small number of receiver circuit units, and the compensation signals Vsrcb' generated from the respective output signal compensators may be supplied to the receiver circuit units which are not coupled to the output signal compensator 200 of FIG. 20.

Figure 21:
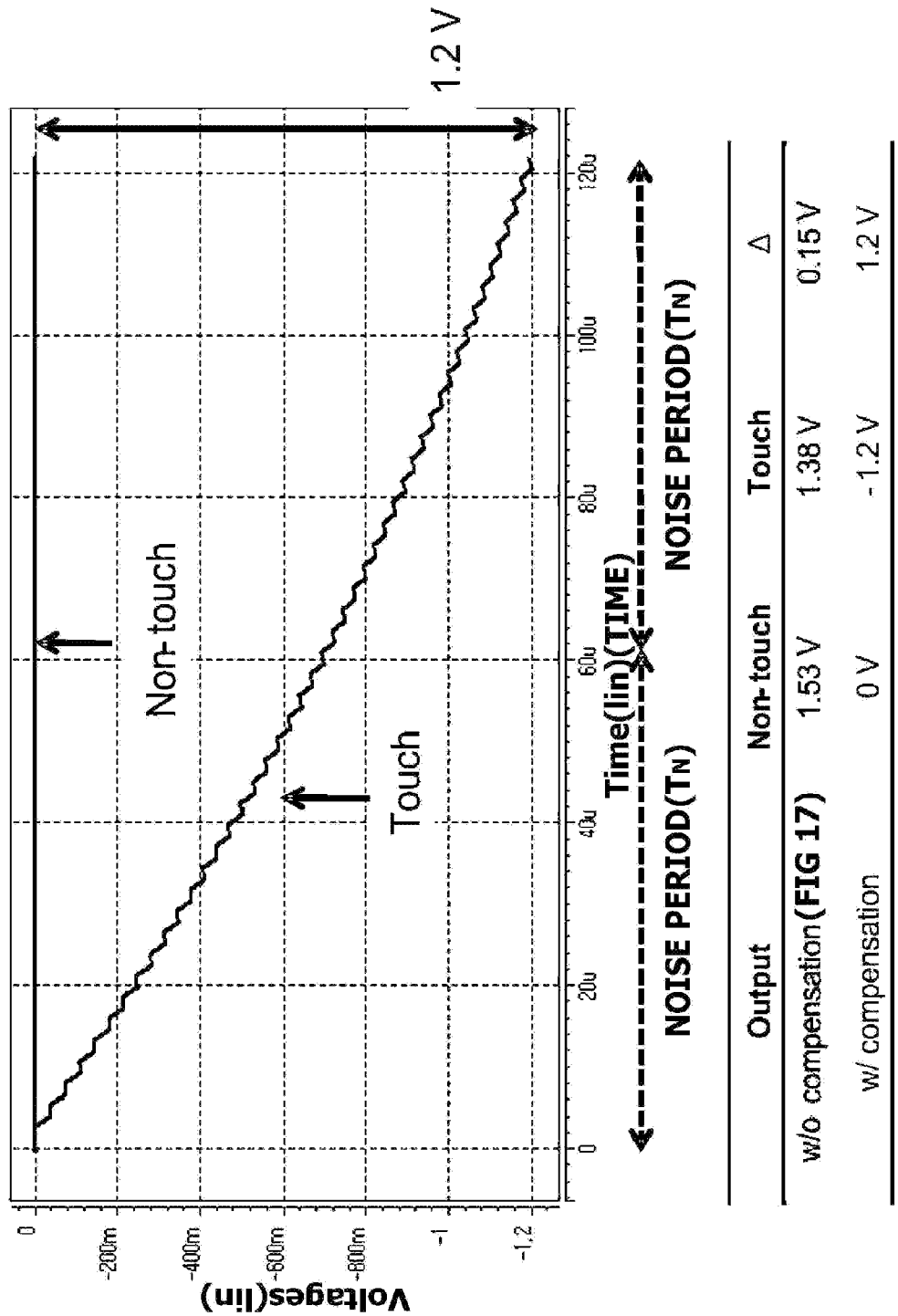
FIG. 21 is a diagram illustrating SPICE simulation results of the circuit of FIG. 20.

FIG. 21 illustrates the SPICE simulation result of the circuit illustrated in FIG. 20.

In the circuit of FIG. 20, the compensation capacitor $Cm_{ij}'$ was set to 2 pF, the integrator resistor $R_I$ was set to 40 kΩ, and the other parameters were set in the same manner as the case of FIG. 19. When the output dynamic range of the receiver circuit unit of FIG. 20 is compensated for, the output voltage of the receiver circuit unit 500 in case where a touch occurred and the output voltage of the receiver circuit unit in case where no touch occurred are −1.2V and 0V, respectively. That is, the dynamic range of the output signal of the receiver circuit unit 500 may be significantly expanded in comparison to the dynamic range of 1.38V to 1.58V when no compensation is performed.

When the technical idea of the present invention is applied to a semiconductor integrated circuit, the driver 300, the driving clock generator 400, and the receiver circuit unit 500 may be implemented in one chip. This implementation may also be applied to all of the embodiments illustrated in FIGS. 5, 11, 12, 16, 18, and 20. The ADC which receives a signal from the output signal compensator 700 or the receiver circuit unit 500 and processes the received signal may also be implemented in one chip.

Furthermore, any components among the variety of components forming the circuit according to the embodiment of the present invention, for example, the driver 300, the driving clock generator 400, the receiver circuit unit 500, the output signal compensator 700, the RC network, and the ADC receiving an output of the receiver circuit unit may be properly distributed and arranged in several integrated chips, according to a circuit designer's intention. This arrangement may be included in the scope of the present invention.

The researchers of the present invention have verified that the integrated circuit chip may normally operate at a power supply voltage of 4V or less, and operate without a separate booster circuit, through a circuit operation simulation based on the level of the recent fabrication technology for semiconductor integrated circuits. Furthermore, the researchers have verified that the touch sensor panel may be driven only with the integrated circuit chip.

Figure 22:
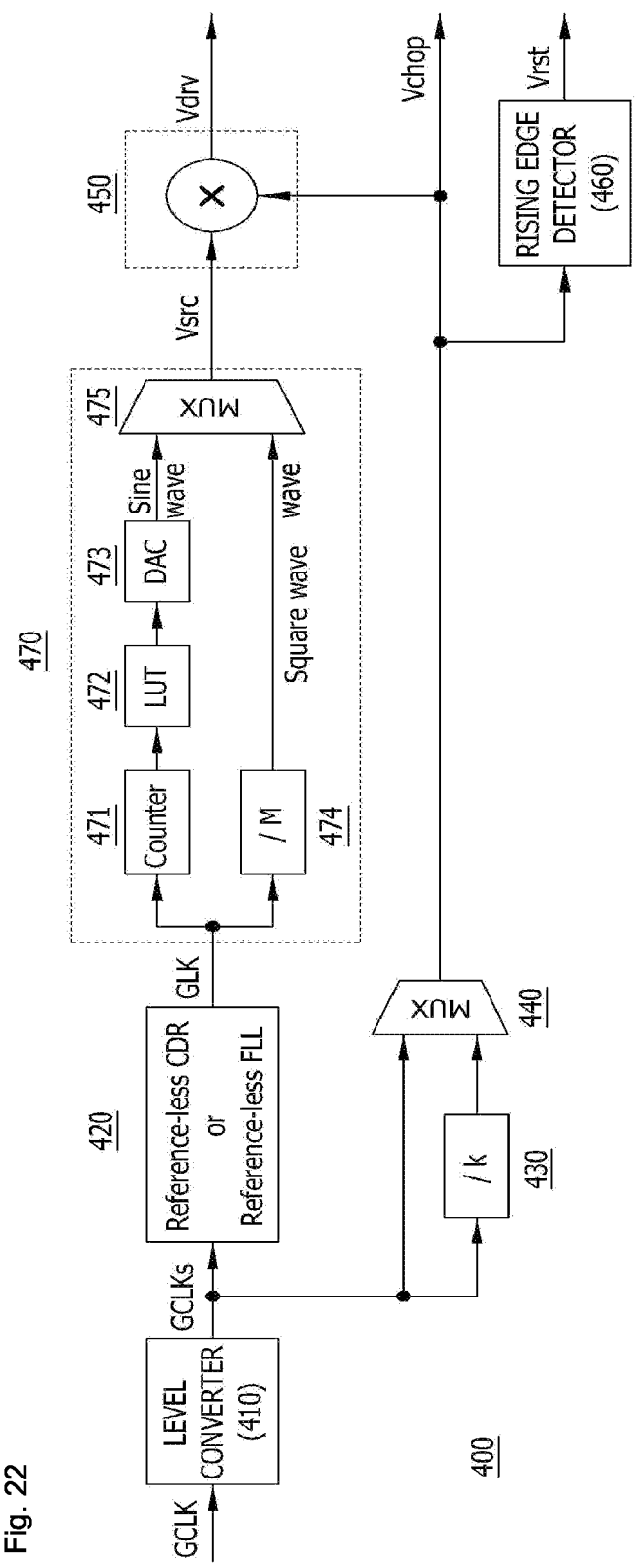
FIG. 22 is a diagram illustrating a driving clock generator according to the embodiment of the present invention.

FIG. 22 illustrates an example of the driving clock generator 400. Hereafter, the function of the driving clock generator 400 will be described in more detail. As described above with reference to FIGS. 13 and 14, the driving signal Vsrc used for generating the touch sensor panel driving signal Vdrv has a frequency corresponding to a positive integer multiple or (positive integer multiple+0.5) of the reciprocal of the VCOM noise period, and the driving signal Vchop for the chopper circuit 540 of the receiver circuit unit 500 and the reset signal Vrst for the charge amplifier and the integrator of the receiver circuit unit 500 have a period corresponding to a positive integer multiple of the period of the VCOM noise which is self-generated noise of the flat panel display.

Figure 23:
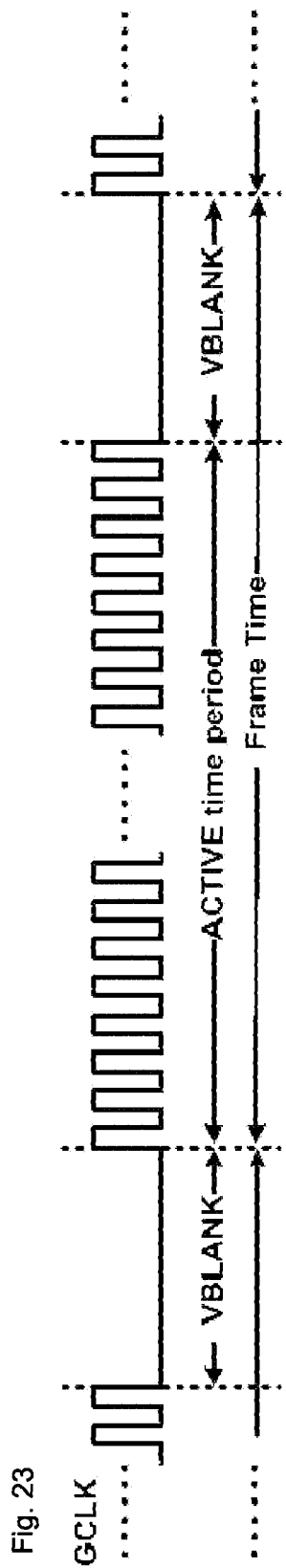
FIG. 23 is a diagram illustrating a gate driving clock signal GCLK during one frame time of the flat panel display.

Since the waveform of the VCOM noise has a noisy characteristic, it is difficult to generate the signals Vsrc, Vdrv, Vchop, and Vrst from the VCOM noise waveform. In the flat panel display 100 such as an LCD, however, the gate driver clock signal GCLK is synchronized with the waveform of the VCOM noise as illustrated in FIG. 8. That is, the rising and falling edges of the gate driver clock signal GCLK coincide with the impulse waveform of the VCOM. Thus, the signals Vsrc, Vdrv, Vchop, and Vrst may be generated from the gate driver clock signal GCLK. As illustrated in FIG. 23, however, the gate driver clock signal GCLK is a clock signal which has rising and falling edges only during an active time period, in which an image signal is driven, in one frame time of the flat panel display, unlike a general clock signal. Furthermore, the gate driver clock signal GCLK maintains a DC value of 0 or 1 during VBLANK period in which the flat panel display drives no image signal. Thus, when the gate driver clock signal GCLK is applied as an input of a general phase locked loop (PLL), the PLL is locked during the active period in which the flat panel display drives an image signal, and the frequency of the PLL output clock signal becomes a positive integer multiple of the frequency of the gate driver clock signal GCLK, which corresponds to a desired value. As illustrated in FIG. 8, the period of the gate driver clock signal GCLK is two times larger than the period of the VCOM noise. Thus, the frequency of the output signal Vsrc of the driving clock generator may be set to a positive integer multiple or (positive integer multiple+0.5) of the reciprocal of the VCOM noise period.

However, during the VBLANK time period in which an edge of the gate driver clock signal GCLK does not occur, only one signal between up and down pulse signals outputted from a phase detector of the PLL is always maintained at '1', and the other signal is always maintained at '0'. Thus, since the control voltage of a voltage controlled oscillator is changed so as not to maintain the same value as the locked state, the PLL escapes from the locked state. Then, during the VBLANK time period, the frequency of the output clock signal of the PLL deviates from the desired value, and the frequencies of the periodic signals Vsrc, Vdrv, Vchop, and Vrst differ from the desired value, which makes it difficult to remove the influence of the VCOM noise in the receiver circuit.

In order to solve such a problem, a clock-data recovery (CDR) circuit or a frequency-locked loop (FLL) circuit 420 may be used in the embodiment of the present invention. The CDR circuit or FLL circuit 420 may recognize the gate driver clock signal GCLK as an arbitrary data input, and generate a clock signal at a predetermined frequency with respect to all of the time periods including the VBLANK time period. General CDR and FLL circuits receive a reference clock signal and data. Thus, since the general CDR and FLL circuits additionally require a crystal oscillator for providing the reference clock signal, and thus increases the fabrication cost of the touch sensor. In order to avoid the increase of the fabrication cost, a reference-less CDR circuit or reference-less FLL circuit may be used instead of the general CDR or FLL circuit. The reference-less CDR circuit or reference-less FLL circuit may generate signals Vsrc, Vdrv, Vchop, and Vrst required for driving the touch sensor from the gate driver clock signal GCLK.

However, in order to realize the technical ideal of the present invention, the phases of the signals Vsrc, Vdrv, Vchop, and Vrst do not need to be synchronized with the phase of the gate driver clock signal GCLK, as long as the frequencies of the signals Vsrc, Vdrv, Vchop, and Vrst are set to a positive integer multiple of the frequency of the gate driver clock signal GCLK or the reciprocal of a positive integer multiple of the frequency of the gate driver clock signal GCLK. In the present embodiment, when the CDR circuit 420 is used, the phases and frequencies of the signals Vsrc, Vdrv, Vchop, and Vrst are synchronized with those of the gate driver clock signal GCLK. However, when the FLL circuit 420 is used, only the frequencies are synchronized with the frequency of the gate driver clock signal GCLK, and the phases are not synchronized with the phase of the gate driver clock signal GCLK. Thus, although the FLL circuit as well as the CDR circuit is used in the driving clock generator, the technical idea of the present invention may be realized. The FLL circuit has no phase detection loop unlike the CDR circuit. Thus, when the FLL circuit is implemented into an integrated circuit, the chip area and power consumption may be reduced, and loop stability may be improved.

Figure 24:
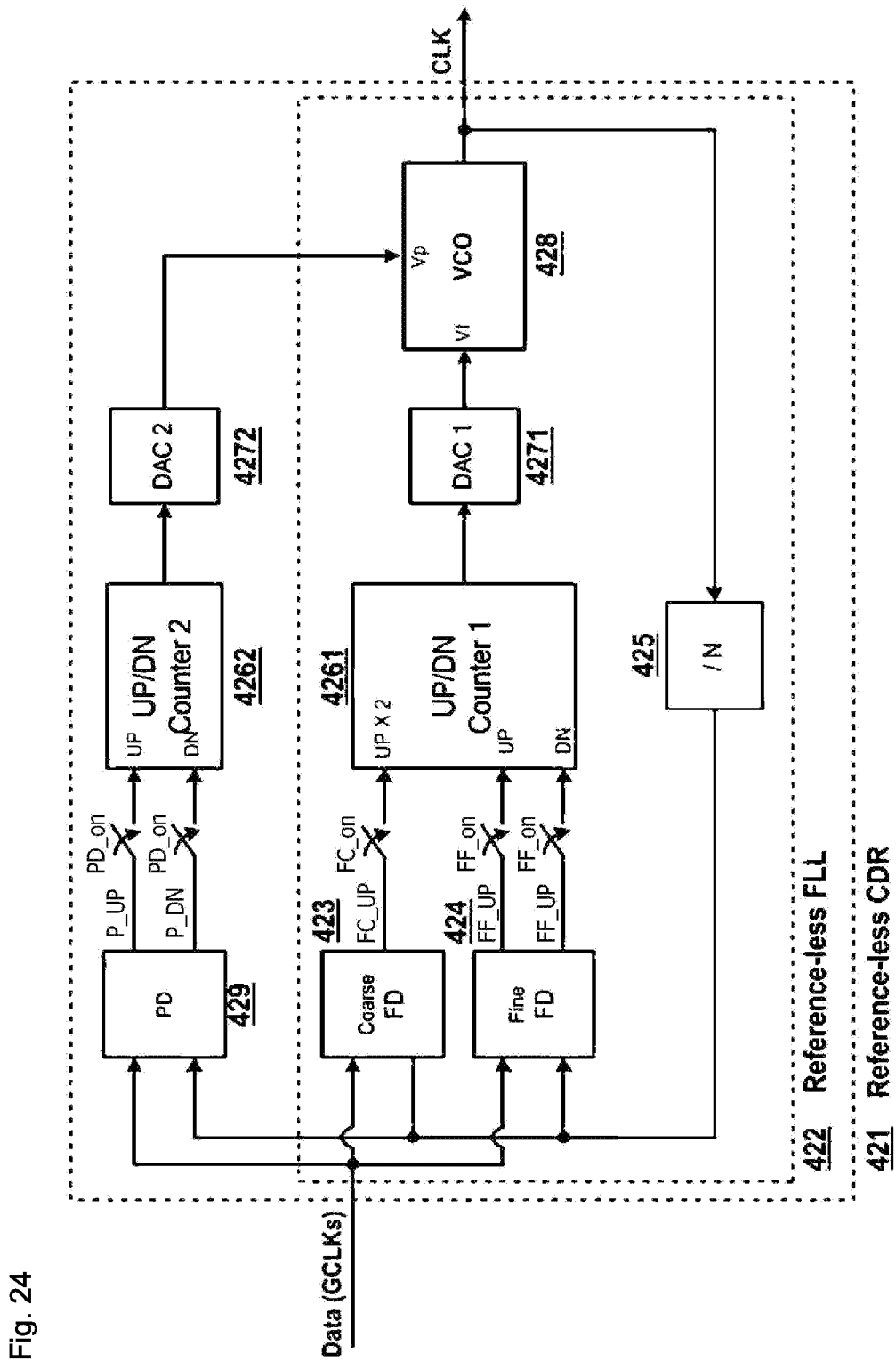
FIG. 24 is a diagram illustrating a reference-less clock data recovery (CDR) circuit or reference-less frequency locked loop (FLL)

FIG. 24 is a block diagram of the reference-less CDR circuit. The reference-less CDR circuit 421 receives a signal GCLKs, of which the amplitude is reduced by passing the gate driver clock signal GCLK through a level converter 410, as a data input of FIG. 24, and generates a regular clock signal CLK having a frequency (N-fGCLK) corresponding to an integer multiple of the frequency of a signal '0101', which is generated during the time period in which an image signal is generated in one frame time, from the highest frequency GCLK of the input signal.

Since the gate driver clock signal GCLK maintains the DC value during the VBLANK time period in one frame time of the flat panel display, the reference-less CDR circuit receiving the signal GCLKs as data input needs to recover a clock signal having the same frequency as the gate driver clock signal GCLK within a short time corresponding to a small number of input signal edges. Thus, the reference-less CDR circuit uses a dual loop structure in which a frequency detector (FD) for extracting frequency information from the input signal GCLKs is divided into a coarse FD 423 and a fine FD 424. When a coarse frequency recovery loop using the coarse FD 423 gradually increases a reference-less CDR output clock CLK from a low frequency to a desired frequency, coarse lock is achieved. Then, as a signal FC_on becomes '0', the coarse frequency recovery loop is cut. From this point, as a signal FF_on becomes 1, a fine frequency recovery loop starts to operate. The outputs of the coarse frequency recovery loop and the fine frequency recovery loop are inputted to the same UP/DN counter 4261. The output of the coarse frequency recovery loop is coupled to the most signal bit (MSB) input of the UP/DN counter, and the output of the fine frequency recovery loop is coupled to the least signal bit (LSB) input of the UP/DN counter. Thus, the coarse frequency recovery loop quickly follows the desired frequency, and the fine frequency recovery loop recovers an accurate frequency.

As described with reference to FIG. 23, when the CDR circuit 421 is used, the phases and frequencies of the output signals Vsrc, Vdrv, Vchop, and Vrst of the driving clock generator 400 are synchronized with those of the gate driver clock signal GCLK. However, in order to realize the technical idea of the present invention, the phases of the output signals Vsrc, Vdrv, Vchop, and Vrst do need be synchronized with the phase of the gate driver clock signal GCLK, as along as the frequencies of the signals Vsrc and Vdrv among the output signals Vsrc, Vdrv, Vchop, and Vrst are set to a positive integer multiple of the frequency of the gate driver clock signal GCLK and the frequencies of the signals Vchop and Vrst are set to the reciprocal of a positive integer multiple of the frequency of the gate driver clock signal GCLK. Thus, although the reference-less FLL circuit 422 obtained by removing the phase detection loop from the reference-less CDR circuit 421 of FIG. 24 is used, the technical idea of the present invention may be realized.

Figure 25:
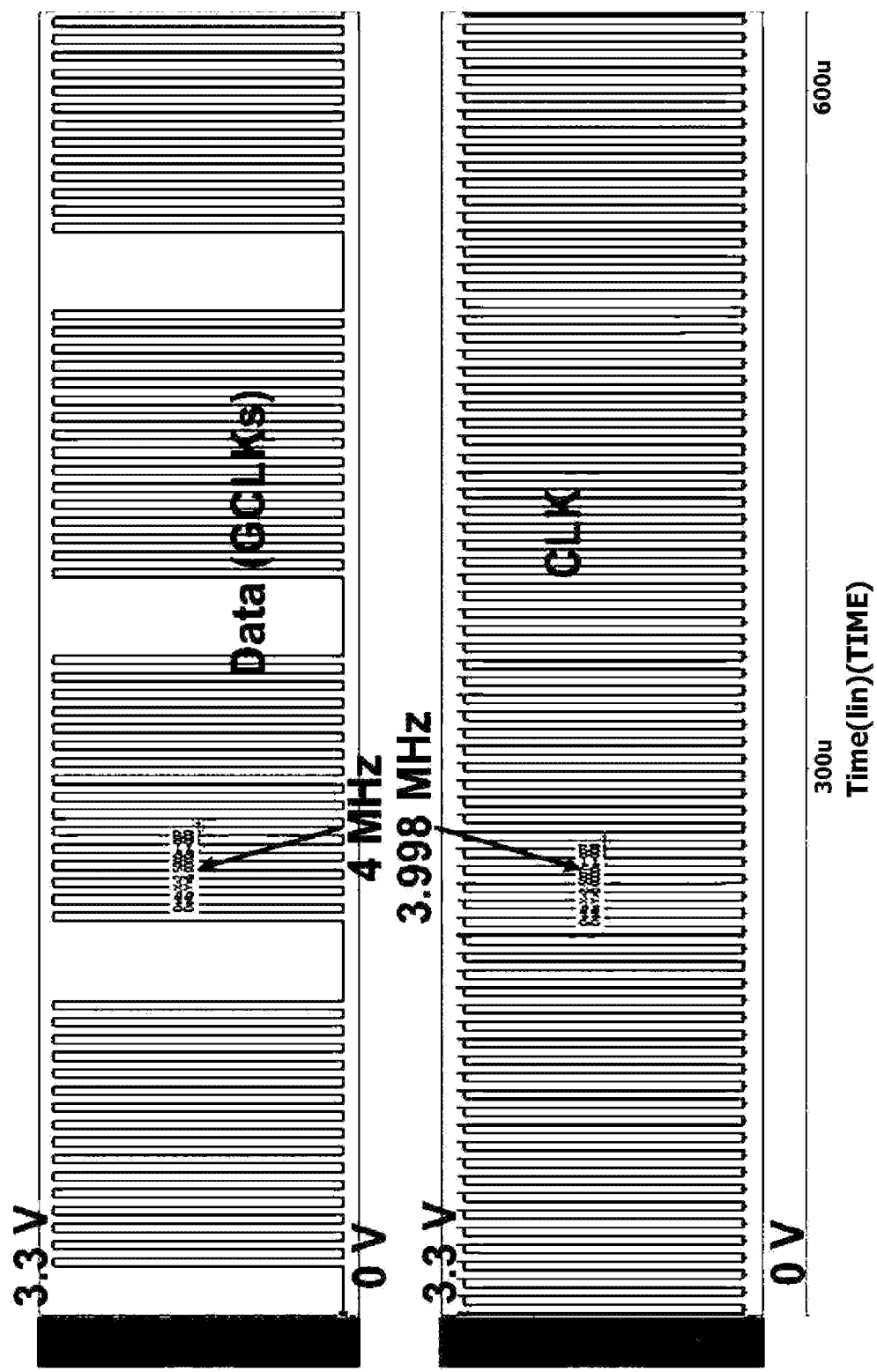
FIG. 25 is a diagram illustrating simulation results of the reference-less FLL.

FIG. 25 illustrates HSPICE simulation results of the reference-less FLL circuit. The actual frequency of the input signal GCLKs to be applied as a data input of the reference-less FLL circuit 422 is about 16 kHz (in case of 60 frame/sec). However, in order to reduce the simulation time, the frequency of the input signal GCLKs was set to 4 MHz. Furthermore, in order to reduce the simulation time, one frame time of the flat panel display was set to 20 clocks of the gate driver clock signal GCLK, the active time period in which an image signal is driven was set to 16 clocks of the gate driver clock signal GCLK, and the VBLANK time period in which no image signal is driven was set to four clocks of the gate driver clock signal GCLK. FIG. 25 illustrates the waveforms of the input signal GCLKs and the recovered output signal CLK of the reference-less FLL circuit 422. Referring to FIG. 25, it can be seen that the frequency of the recovered output signal CLK is uniformly approximate to the frequency of the input signal GCLKs during the entire frame time including the VBLANK time period. While the reference-less FLL circuit 422 recovers the frequency of the output signal CLK into the frequency of the input signal GCLKs, a time corresponding to 1,200 clocks of the input signal GCLKs was required.

As described above, the driving signal Vchop of the chopper circuit 540 of the receiver circuit unit 500 has a period corresponding to an even multiple of the VCOM noise period, and the time during which the driving signal Vchop is maintained at '+1' needs to be equal to the time during which the driving signal Vchop is maintained at '−1'. In the present embodiment, the period of the gate driver clock signal GCLK is two times larger than the VCOM noise period TN, and the duty cycle of the gate driver clock signal GCLK is 50% of the duty cycle of the VCOM noise. Thus, in the driving clock generator illustrated in FIG. 22, the period of the driving signal Vchop may be set to a positive integer multiple of the period of the gate driver clock signal GCLK. For example, the period of the driving signal Vchop may be set k times larger than the period of the gate driver clock signal GCLK.

As described above, the driving signal Vsrc used for generating the touch sensor panel driving signal Vdrv may include a sine wave as well as a square wave. A sine wave generator 470 within the driving clock generator 400 generates a sine wave at a desired frequency from the output signal CLK of the reference-less FLL circuit 420. The sine wave generator 470 receives the output signal CLK having a higher frequency than the frequency of the driving signal Vsrc, and generates a sine wave or square wave having a frequency obtained by dividing the frequency of the output signal CLK by M. The sine-wave generator 470 includes a counter 471 for generating a sine wave, a look-up table (LUT) 472, a digital-to-analog converter (DAC) 473, a frequency divider 474 for driving the frequency of the square wave into a desired frequency, and a multiplexer for selecting one of the sine wave and the square wave. The LUT 472 and the DAC 473 form one numerical controlled oscillator (NCO).

The frequency of the gate driver clock signal GCLK is multiplied by N through the frequency divider 425 positioned in the internal feedback path of the reference-less CDR circuit 421 or the reference-less FLL circuit 422, and divided by M through the sine wave generator 470. Thus, the frequency of the driving signal Vsrc becomes N/M times larger than the frequency of the gate driver clock signal GCLK. In order to realize the technical idea of the present invention, the frequency of the driving signal Vsrc needs to be set to a positive integer multiple or (positive integer multiple+0.5) of the reciprocal ($f_{CK}=1/TN$) of the VCOM noise period. Referring to FIG. 8, since the reciprocal $f_{CK}$ of the VCOM noise period is two times larger than the frequency fGCLK of the gate driver clock signal GCLK, the frequency of the driving signal Vsrc becomes a positive integer multiple of the frequency of the gate driver clock signal GCLK. That is, N/M needs to become a positive integer at all times.

The reset signal Vrst for resetting output values of the charge amplifier and the integrator of the receiver circuit unit 500 is synchronized with the driving signal Vchop. In the present embodiment, the reset signal Vrst is generated by passing the driving signal Vchop through a rising edge detector 460 as illustrated in FIG. 22.

However, the waveforms illustrated in FIG. 15 correspond to the case of k=2 in FIG. 22. In order to generate the driving signal Vchop, an additional logic circuit is required, which is not illustrated in FIG. 22. The level converter 410 of FIG. 22 converts the gate driver clock signal GCLK having a large amplitude (for example, −5V to +25V) into the input signal GCLKs having a small amplitude at a digital level suitable for the touch sensor chip.

FIG. 26 illustrates the synchronized signals Vsrc and Vrst which are generated from the gate driver clock signal GCLK through the reference-less CDR circuit 422 of FIG. 22.

As illustrated in FIG. 26, the frequency of the signals Vsrc(a) and Vsrc(b) is three times larger than the reciprocal $f_{CK}$ of the VCOM noise period TN (six times larger than the frequency of the gate driver clock signal GCLK), and the frequency of the signals Vsrc(c) and Vsrc(d) is 3.5 times larger than the reciprocal $f_{CK}$ of the VCOM noise period TN (seven times larger than the frequency of the gate driver clock signal GCLK). On the VCOM noise spectrum illustrated in FIG. 9, the signals Vsrc(a) and Vsrc(b) have a frequency of $3 \cdot f_{CK}$. Thus, the signals Vsrc(a) and Vsrc(b) corresponds to a frequency band of which noise power is large. Furthermore, the signals Vsrc(c) and Vsrc(d) have a frequency of $3.5 \cdot f_{CK}$. Thus, the signals Vsrc(c) and Vsrc(d) corresponds to a frequency band of which noise power is small. As illustrated in FIG. 26, the driving signal Vsrc is a time-periodic signal, and may include a sine wave as well as a square wave.

According to the embodiments of the present invention, the mutual capacitance measuring touch sensor may reduce the influence of VCOM noise self-generated from the flat panel display such that the influence of the VCOM noise does not almost appear in an output signal of the receiver circuit unit. Thus, the amplitude of the touch sensor panel driving signal does not need to be increased, but may be maintained at a digital signal level. Therefore, the power consumption of the touch sensor chip may be reduced, and a high-voltage driving circuit may be removed to reduce the fabrication price of the touch sensor chip.

Furthermore, since the touch sensor circuit may be operated in the entire time region where the flat panel display operates as well as the VBLANK time period in which the flat panel display does not operate, the touch sensing speed may be increased.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A capacitive touch sensor which includes a flat panel display for displaying an image and a touch sensor panel positioned on the flat panel display or embedded in the flat panel display, the capacitive touch sensor comprising:
    a driving clock generator configured to generate a plurality of time-periodic output signals, and apply the time-periodic output signals of the driving clock generator to the touch sensor panel and a receiver circuit unit;
    a driver configured to generate a driving signal of the touch sensor panel using a part of the time-periodic output signals of the driving clock generator; and
    the receiver circuit unit configured to process noise contained in a signal received from the touch sensor panel, using the time-periodic output signals,
    wherein one or more of the time-periodic output signals of the driving clock generator have a period corresponding to an even multiple of a period of self-generated noise of the flat panel display.

2. A capacitive touch sensor comprising:
    a flat panel display;
    a touch sensor panel coupled to the flat panel display;
    a driving clock generator configured to generate a plurality of time-periodic output signals, using a clock signal for driving a gate of the flat panel display;
    a driver configured to drive the touch sensor panel using a part of the time-periodic output signals of the driving clock generator; and
    a receiver circuit unit configured to receive a signal from the touch sensor panel and reduce noise,
    wherein one or more of the time-periodic output signals of the driving clock generator have a period corresponding to an even multiple of a period of self-generated noise of the flat panel display.

3. The capacitive touch sensor according to claim 1, wherein the receiver circuit unit is operated to reduce an influence of the noise in an output signal thereof, based on the characteristic that the noise has a time periodic property.

4. The capacitive touch sensor according to claim 1, wherein the noise is taken from a noise waveform of a common electrode, and the receiver circuit unit compensates for the noise.

5. The capacitive touch sensor according to claim 4, wherein the noise waveform comprises a voltage waveform between the common electrode and a common ground.

6. The capacitive touch sensor according to claim 5, wherein the common ground comprises a terminal at which a ground terminal of a driving circuit for driving the panel of the flat panel display and a ground terminal of the touch sensor circuit are shorted to each other.

7. The capacitive touch sensor according to claim 1, wherein one signal of the time-periodic output signals of the driving clock generator has a frequency corresponding to a positive integer multiple or (positive integer multiple+0.5) of a reciprocal of the period of the common electrode noise.

8. The capacitive touch sensor according to claim 1, wherein a noise waveform is transmitted to the receiver circuit unit through an RC network including resistance and capacitance.

9. The capacitive touch sensor according to claim 8, wherein the noise waveform is transmitted to an input terminal of an amplifier existing within the receiver circuit unit.

10. The capacitive touch sensor according to claim 8, wherein the RC network has a time constant larger than a reciprocal of the maximum frequency component of the noise waveform of the common electrode.

11. The capacitive touch sensor according to claim 1, wherein the time-periodic output signals of the driving clock generator of the capacitive touch sensor are generated using a gate driver clock signal of the flat panel display.

12. The capacitive touch sensor according to claim 1, wherein one of the time-periodic output signals of the driving clock generator comprises a sine wave or square wave.

13. The capacitive touch sensor according to claim 2, wherein the receiver circuit unit comprises:
 a charge amplifier configured to receive a signal from the touch sensor panel;
 an analog multiplier configured to multiply an output of the charge amplifier by one of the time-periodic output signals of the driving clock generator;
 a chopper circuit configured to multiply an output of the analog multiplier by another of the time-periodic output signals of the driving clock generator; and
 an integrator configured to integrate an output signal of the chopper circuit or a low-pass filter configured to pass only a low-frequency component of the output signal of the chopper circuit.

14. The capacitive touch sensor according to claim 2, wherein the noise is reduced through two multiplications performed through the receiver circuit unit.

15. A capacitive touch sensor comprising:
 a flat panel display;
 a touch sensor panel coupled to the flat panel display;
 a driving clock generator configured to generate a plurality of time-periodic output signals using a clock signal for driving a gate of the flat panel display;
 a driver configured to drive the touch sensor panel using a part of the time-periodic output signals of the driving clock generator;
 a receiver circuit unit configured to receive a signal from the touch sensor panel and reduce an influence of common electrode noise of the flat panel display; and
 an AC coupling circuit configured to transmit the waveform of the common electrode noise to the receiver circuit unit,
 wherein one or more of the time-periodic output signals of the driving clock generator have a period corresponding to an even multiple of a period of self-generated noise of the flat panel display.

16. A capacitive touch sensor which includes a flat panel display for displaying an image and a touch sensor panel provided on or in the flat panel display, the capacitive touch sensor comprising:
 a driving clock generator configured to generate a plurality of time-periodic output signals using a clock signal for driving a gate of the flat panel display;
 a driver having multiple output terminals of which each is electrically coupled one-to-one to one of Y electrodes of the touch sensor panel; and
 a receiver circuit unit having multiple input terminals of which each is electrically coupled one-to-one to one of X electrodes of the touch sensor panel,
 wherein each of the multiple input terminals of the receiver circuit unit is electrically coupled one-to-one to an inverting input terminal of a charge amplifier existing in the receiver circuit unit,
 wherein mutual capacitance is formed between an i-th Y electrode and a j-th X electrode of the touch sensor panel, and
 wherein one or more of the time-periodic output signals of the driving clock generator have a period corresponding to an even multiple of a period of self-generated noise of the flat panel display.

17. The capacitive touch sensor according to claim 15, wherein the operation of reducing the influence of the noise within the receiver circuit unit is performed through a multiplication operation of signals inputted to the receiver circuit units and an integration operation or low-pass filtering operation following the multiplication operation.

18. The capacitive touch sensor according to claim 15, wherein the driver comprises a unit configured to perform a multiplication operation on signals.

19. The capacitive touch sensor according to claim 7, wherein
 another signal of the time-periodic output signals of the driving clock generator performs the function of a chopper signal,
 the chopper signal is constantly maintained at '+1' or '−1' during a time period corresponding to a positive integer multiple of the self-generated noise period, and
 the chopper signal comprises a time-periodic digital signal wherein the time period during which the digital signal is constantly maintained at '+1' is equal to the time period during which the digital signal is constantly maintained at '−1'.

20. The capacitive touch sensor according to claim 15, wherein one or more of the time-periodic output signals of the driving clock generator comprise a time-periodic digital signal wherein the time during which the signal level thereof is maintained at '1' is much shorter than the time during which the signal level thereof is maintained at '0', and
 an integrator or low-pass filter existing in the receiver circuit unit is reset at the time period in which the signal level is maintained at '1', and performs an integration or low-pass filtering operation during the time period in which the signal level is maintained at '0'.

21. The capacitive touch sensor according to claim 1, wherein the receiver circuit unit is coupled to an output signal compensator for increasing an output dynamic range thereof.

22. The capacitive touch sensor according to claim 21, wherein the output signal compensator comprises:
 a comparator;
 a successive approximation register;
 a digital-to-analog converter;
 a voltage buffer; and
 an inverter.

23. A capacitive touch sensor which drives a touch sensor panel coupled to a flat panel display, the capacitive touch sensor comprising:
- a driving clock generator configured to generate a plurality of time-periodic output signals using a clock signal for driving a gate of the flat panel display;
- a driver configured to drive the touch sensor panel using a part of the time-periodic output signals of the driving clock generator;
- a receiver circuit unit configured to receive a signal from the touch sensor panel and reduce an influence of common electrode noise of the flat panel display; and
- an analog-to-digital converter (ADC) configured to receive an output signal of the receiver circuit unit,
- wherein the driving clock generator, the driver, the receiver circuit unit, and the ADC are included in one integrated circuit chip, and
- wherein one or more of the time-periodic output signals of the driving clock generator have a period corresponding to an even multiple of a period of self-generated noise of the flat panel display.

24. The capacitive touch sensor according to claim 23, wherein a power supply voltage of the integrated circuit chip is 4V or less,
- the power supply voltage is not boosted in the integrated circuit chip,
- the touch sensor panel is driven only through the integrated circuit chip, and
- an analog signal received from the touch sensor panel is processed through the integrated circuit chip to output a digital signal.

25. The capacitive touch sensor according to claim 4, wherein the common electrode terminal indicates a transparent electrode applied onto the entire surface of a glass plane positioned remote from a back light unit (BLU), between two glass planes forming a pixel element in a liquid crystal display based on vertical alignment.

26. The capacitive touch sensor according to claim 4, wherein the common electrode terminal indicates a common electrode pattern positioned with a thin film transistor on a glass plane positioned close to a BLU, between two glass planes forming a pixel element in a liquid crystal display based on in-plane switching.

27. The capacitive touch sensor according to claim 1, wherein the driving clock generator comprises a reference-less clock data recovery (CDR) circuit or a reference-less frequency-locked loop (FLL).

28. The capacitive touch sensor according to claim 1, wherein the driving clock generator comprises:
- a level converter;
- a reference-less CDR circuit or reference-less FLL;
- a frequency divider;
- a rising edge detector;
- a multiplexer;
- a counter;
- a look-up table;
- a digital-to-analog converter; and
- a chopper circuit.

29. The capacitive touch sensor according to claim 1, wherein a touch operation is recognized even during an active time period in which the flat panel display drives an image signal and VBLANK and HBLANK time periods in which the flat panel display drives no image signal.

30. The capacitive touch sensor according to claim 1, wherein the receiver circuit unit comprises:
- a charge amplifier configured to receive a signal from the touch sensor panel;
- an analog multiplier configured to multiply an output of the charge amplifier by one of the time-periodic output signals of the driving clock generator; and
- an integrator configured to integrate an output signal of the analog multiplier or a low-pass filter configured to pass only a low-frequency component of the output signal of the analog multiplier,
- wherein one signal of the time-periodic output signals of the driving clock generator has a frequency corresponding to a positive integer multiple or (positive integer multiple+0.5) of a reciprocal of the period of the common electrode noise.

* * * * *